(12) United States Patent
Upadhyay et al.

(10) Patent No.: US 12,373,173 B2
(45) Date of Patent: Jul. 29, 2025

(54) METHOD FOR CONVERTING MODELS TO PROGRAMS

(71) Applicant: Martian Learning, Inc., North Potomac, MD (US)

(72) Inventors: Shriyash K. Upadhyay, North Potomac, MD (US); Etan J. Ginsberg, North Potomac, MD (US); Luka Samkharadze, North Potomac, MD (US)

(73) Assignee: Martian Learning, Inc., North Potomac, MD (US)

( * ) Notice: Subject to any disclaimer, the term of this patent is extended or adjusted under 35 U.S.C. 154(b) by 0 days.

(21) Appl. No.: 18/800,731

(22) Filed: Aug. 12, 2024

(65) Prior Publication Data

US 2025/0053391 A1    Feb. 13, 2025

Related U.S. Application Data

(60) Provisional application No. 63/532,206, filed on Aug. 11, 2023, provisional application No. 63/588,611, filed on Oct. 6, 2023, provisional application No. 63/598,779, filed on Nov. 14, 2023.

(51) Int. Cl.
*G06F 8/35*   (2018.01)
*G06F 8/72*   (2018.01)

(52) U.S. Cl.
CPC . *G06F 8/35* (2013.01); *G06F 8/72* (2013.01)

(58) Field of Classification Search
CPC ..... G06F 8/35; G06F 8/72; G06F 9/44; G06F 5/046; G06N 3/02; G06N 3/08
See application file for complete search history.

(56) References Cited

U.S. PATENT DOCUMENTS

| | | | |
|---|---|---|---|
| 12,136,034 B2* | 11/2024 | Dimitriadis | G06N 3/08 |
| 2021/0073632 A1 | 3/2021 | Iyer et al. | |
| 2021/0240453 A1 | 8/2021 | Badlani et al. | |
| 2022/0215241 A1* | 7/2022 | Fang | G06N 5/01 |
| 2022/0374232 A1 | 11/2022 | Zhang et al. | |
| 2023/0177329 A1* | 6/2023 | Kobayashi | G06N 3/084 |
| | | | 706/15 |

OTHER PUBLICATIONS

Weiss, Gail, et al., "Thinking Like Transformers", Proceedings of the 38th International Conference on Machine Learning, 2021.
Bricken, Trenton, et al., "Towards Monosemanticity: Decomposing Language Models With Dictionary Learning", Anthropic, Transformer Circuits Thread, https://transformer-circuits.pub/2023/monosemantic-features/index.html, Oct. 4, 2023.

(Continued)

*Primary Examiner* — Hanh Thi-Minh Bui
(74) *Attorney, Agent, or Firm* — Jeffrey Schox; Diana Lin

(57) ABSTRACT

In variants, the method can include generating mapping model training data, determining the mapping model, and predicting a program based on a transformer. The method can optionally include evaluating the mapping model, running analyses on the program, and/or utilizing the program and/or generated program analyses. The method functions to convert transformer models into programs that can be characterized and/or analyzed using program analysis techniques.

17 Claims, 20 Drawing Sheets

(56) References Cited

OTHER PUBLICATIONS

Cropper, Andrew, et al., "Inductive Logic Programming at 30: A New Introduction", Journal of Artificial Intelligence Research 74 (2022) 765-850, published Jun. 2022.

Elhage, Nelson, et al., "Toy Models of Superposition", Anthropic, Transformer Circuits Thread, https://transformer-circuits.pub/2022/toy_model/index.html, Sep. 14, 2022.

Friedman, Dan, et al., "Learning Transformer Programs", arXiv:2306.01128, https://arxiv.org/abs/2306.01128, Jun. 1, 2023.

Henighan, Tom, et al., "Superposition, Memorization, and Double Descent", Anthropic, Transformer Circuits Thread, https://transformer-circuits.pub/2023/toy-double-descent/index.html, Jan. 5, 2023.

Lindner, David, et al., "Tracr: Compiled Transformers as a Laboratory for Interpretability", arXiv:2301.05062, https://arxiv.org/abs/2301.05062, Jun. 7, 2023.

Merrill, William, et al., "A Logic for Expressing Log-Precision Transformers", arXiv:2210.02671, https://arxiv.org/abs/2210.02671, May 24, 2023.

* cited by examiner

METHOD FOR CONVERTING MODELS TO PROGRAMS

CROSS-REFERENCE TO RELATED APPLICATIONS

This application claims the benefit of U.S. Provisional Application No. 63/532,206 filed Aug. 11, 2023, U.S. Provisional Application No. 63/588,611 filed Oct. 6, 2023, and U.S. Provisional Application No. 63/598,779 filed Nov. 14, 2023, each of which is incorporated in its entirety by this reference.

TECHNICAL FIELD

This invention relates generally to the modeling field, and more specifically to a new and useful method to convert transformer models into human-readable programs.

DETAILED DESCRIPTION

The following description of the embodiments of the invention is not intended to limit the invention to these embodiments, but rather to enable any person skilled in the art to make and use this invention.

1. Overview

Figure 1:
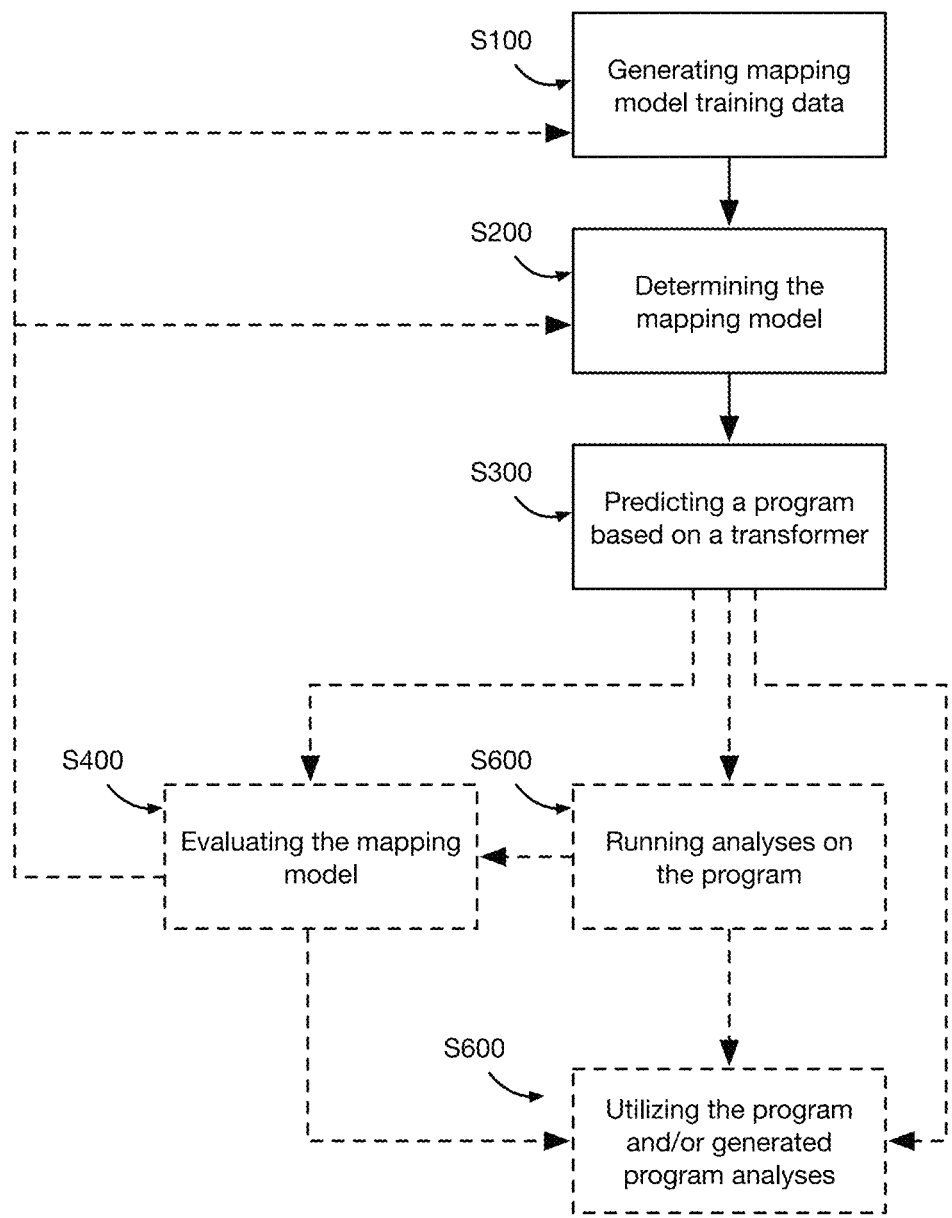
FIG. 1 is a schematic representation of a variant of the method.

In variants (e.g., example shown in FIG. 1), the method can include generating mapping model training data S100, determining the mapping model S200, and predicting a program based on a transformer S300. The method can optionally include evaluating the mapping model S400, running analyses on the program S500, and/or utilizing the program and/or generated program analyses S600. The method functions to convert transformer models into programs that can be characterized and/or analyzed using program analysis techniques.

In an illustrative example, the method can include: generating a set of program-transformer model pairs; determining a mapping model based on the set of program-transformer model pairs; and predicting a program based on a transformer model using the mapping model. The set of program-transformer model pairs can be generated by: determining a set of target programs (e.g., retrieving known programs, generating random programs, manually coding programs, etc.) and generating one or more training transformer models ("transformers") for each program (e.g., using a RASP compiler or another transformer generation module).

In an illustrative example, a single transformer can be generated for each program by the transformer generation module, wherein the resultant transformer can be perturbed (e.g., by rotating the weight matrix, etc.) to generate secondary transformers associated with the respective program. In a second illustrative example, multiple transformers can be generated for each program using different transformer-generation methods. In a third illustrative example, a transformer is learned for a given program by training the transformer to output the program's output, given the same input. However, the program-transformer pair can be otherwise determined. The mapping model can be trained to predict the program based on the paired transformer(s).

In an illustrative example, training the mapping model can include: representing an input transformer in an intermediate representation (e.g., graph representation, embedding, etc.), and predicting a program based on the intermediate representation (e.g., decoding the graph representation, embedding, and/or other representation thereof into a program). The mapping model can be trained (e.g., updated) based on a comparison between the predicted program and the target program that is paired with the input transformer.

In an illustrative example, using the mapping model can include: predicting the program based on a (test) transformer by: representing the (test) transformer in an intermediate representation (e.g., graph representation, embedding, etc.), and predicting a program based on the intermediate representation using the trained mapping model. The resultant program can be analyzed (e.g., stack traced, analyzed for correctness, analyzed for robustness, analyzed for safety, proven, etc.) and/or otherwise characterized. The resultant program analysis can be associated with the (test) transformer, and be used for transformer selection (e.g., used to route a prompt to one of a set of candidate transformers) and/or otherwise used. However, the method can be otherwise performed.

However, the method can be otherwise performed.

2. Technical Advantages

In variants, the method can confer several benefits over conventional systems.

First, variants of the method enable certain machine learning models (i.e., transformer models) to be converted into programs. In examples, a transformer model can be a machine learning model that learns context and thus, meaning, by tracking relationships in data (e.g., sequential data), such as words in a sentence. Transformer models (e.g., transformers) are traditionally extremely complex and opaque systems that provenly performed challenging tasks at a high quality, but do not provide much insight into the mechanisms employed to accomplish such tasks. In contrast, programs can be analyzed and introspected. However, conventional methods cannot simplify transformers into programs, and have only been able to convert programs into more complex transformers. Variants of this method can enable what was previously not possible—the conversion of transformers into human-readable programs. In variants, the method can accomplish this by generating training data by converting target programs into transformers, then training a model (e.g., including a decoder) to decode a transformer representation (e.g., structural representation or embedding of the transformer) into a program, using the target program as the training target domain. Human readable programs are interpretable, enabling observation of mechanisms underlying transformer operation. In an example, interpretability can enable bugs in a transformer to be identified and fixed in a targeted manner (e.g., without retraining the transformer using new training data); and the fixed program can optionally be mapped back into a transformer.

Second, in variants, generated program representations of transformers can be easily (e.g., computationally cheaply, etc.) transformed and/or analyzed in ways that currently only programs can be. Converting transformers into programs can enable the generated program to be automatically optimized, manually edited, merged with other programs, decomposed into functions, analyzed via stack tracing, used to generate proofs of correctness, made sparse, and/or otherwise transformed. Proofs of correctness are much simpler to craft about programs in comparison to transformers. This would allow proving algorithms are correct and true objectively-a significant impact to the technical field. The generated program can be used on its own or converted back into a transformer. Analyses (e.g., generated program analyses and/or transformer analyses) can be used to: prove transformer properties (e.g., determinism, specification satisfaction, correctness, etc.), simplify transformer execution, make transformer execution more efficient, route prompts to a given transformer (e.g., having a predetermined set of program characteristics), and/or be otherwise used.

Third, in variants, validation of the mapping model 300 (e.g., using inclusion preservation and/or quality preservation) ensures that the generated programs reflect the underlying functionality of the transformer without loss of information. Usage of quality preservation (e.g., measuring how well the generated program generates outputs which preserve the distribution of output quality of the original transformer, etc.) ensures that the mapping preserves underlying mechanics of the transformer. Usage of inclusion preservation (e.g., wherein when the original transformer comprises multiple sub-transformers trained to accomplish particular tasks, measuring whether the generated program includes sub-programs which also accomplish those particular tasks, etc.) ensures that the program is interpretable (e.g., the pieces of the program can be understood in the context of understanding the program overall, etc.). In variants, quality preservation and/or inclusion preservation can be quantitatively measurable, enabling mapping models 300 to be compared to one another and improved over time.

Figure 5A:
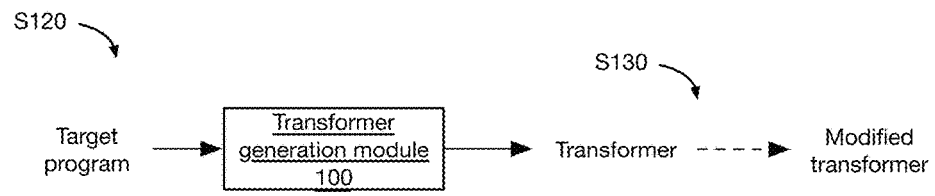
FIGS. 5A-5B are schematic representations of variants of S120.

Fourth, in variants, generating training transformers using Restricted Access Sequence Processing language (RASP) programs, Coding RAte TransformEr (CRATE) generation methods, and/or other efficient transformer generation methodologies enables a high number of transformers to be generated. This, in turn, enables the mapping model to be trained on a large synthetically-generated corpus of training data. Generating transformers from RASP programs and/or generating CRATE transformers from pseudocode enable the underlying mechanics of a program to be represented in a transformer. Thus, the training transformers can be quality preserving and/or inclusion preserving. Additionally, modifying transformers generated in this manner (e.g., by tuning, basis matrix rotation, etc.; example shown in FIG. 5A) can increase the volume of the training data set, decrease the sparsity of the training data set, make the training transformers match the distribution of real-world transformers, and/or otherwise augment the training data set. In variants, programs written using conventional frameworks and/or languages (e.g., python code, conditional programs, etc.) can also be used to generate transformers (e.g., directly or via an intermediate RASP or CRATE program), wherein the mapping model can be trained to predict the program written using the conventional frameworks and/or languages (e.g., from a transformer). In other variants, the mapping model can optionally output a program representation, wherein the program representation can be converted into a program written using the conventional frameworks and/or languages by a program generation module (e.g., program decoder) specific to the conventional framework and/or language. This can enable training transformers, generated through RASP or other similar methods, to be used as training data for mapping models 300 designed for usage on transformers not generated through such methods.

Fifth, in variants, generated programs can be used in lieu of transformers. Programs are generally computationally cheaper and faster to run than transformers, enabling them to be used in a wider variety of contexts which conventionally do not support the usage of transformers due to computational constraints. Generated programs can selectively be used in place of transformers responsive to particular user conditions and/or context, enabling fewer computational resources to be used for a set of prompts.

Sixth, in variants, the programs can be generated nondeterministically (e.g., by a machine learning model). This enables the system to incorporate uncertainty and/or randomness, to be able to handle different inputs (e.g., transformers with different architectures than the training transformers, transformers that are not limited to a strict set of architectures, etc.), to be able to be flexible (e.g., to accommodate new transformer architectures or parameters), to better represent real world programs (e.g., because real-world systems are stochastic), and/or provide other benefits.

However, further advantages can be provided by the system and method disclosed herein.

3. System

In variants, the system functions to facilitate the modeling of transformers as programs. The system can include a mapping model configured to convert transformers (or representations thereof) to programs (or representations thereof). The system can optionally include: a transformer generation module 100 configured to generate training transformers from target programs; a transformer representation module 200 configured to reduce the transformer into a compact representation; an output program generation module 400 configured to generate a program from a program representation; a program representation module 500 configured to convert a program into a program representation; and/or any other suitable set of components. The system can include one or more of the aforementioned components.

In variants, methods and processes applied to "transformers" herein can be applied to other neural network models, such as recurrent neural networks (RNN), convolutional neural networks (CNN), deep neural networks (DNN), models with one or more hidden layers, models that model hidden decisions or steps (e.g., hidden Markov models), encoders, decoders, combinations thereof, and/or any other suitable model architecture. Alternatively, the method can be only applied to transformers, and not to any other model architecture.

All or portions of the system can be hosted, run, executed, or otherwise managed by a remote computing system (e.g., cloud platform, etc.), but can alternatively be managed by a local computing system and/or any other computing system.

All or portions of the system can be managed by an entity separate from the users, but can alternatively be managed by the users themselves.

Transformers function to perform complex tasks given a prompt. A prompt can be or include: text, images, video, audio, signals, 3D measurements (e.g., point clouds, geometric models, etc.), code, and/or any other suitable modality. Transformers can be tailored to a particular task, can be generalized, and/or can be otherwise characterized. Transformers can be generated by a transformer generation module 100, received from a third party (e.g., wherein the transformer attributes are received from a third party), and/or can otherwise be determined. Transformers can be generated in S120, S600, and/or at any other suitable time. Transformers can optionally be decomposable into other transformers (e.g., "sub-transformers"), not composable into other transformers, and/or otherwise characterized. Transformers and/or sub-transformers can optionally be "chained" (e.g., wherein the output of a first transformer is the input of a second transformer), not chained, and/or otherwise characterized.

Transformers can be non-semantic (e.g., a human cannot determine the purpose of a given transformer based on its weights), semantic, and/or otherwise characterized. A transformer preferably includes a deep learning model architecture that uses a highly parallelized and stable system, which allows the model to learn long-range dependencies in the data and attend to multiple aspects of the input to draw patterns of connections; however, transformers can be otherwise configured. Transformers are preferably probabilistic but can alternatively be deterministic and/or otherwise characterized. Transformers can have one or multiple modalities and/or domains. In examples, transformers can be used for content generation, translation, content analysis, and/or other use cases. Transformers can have any suitable temperature (e.g., zero, non-zero, etc.). Examples of transformers include Bidirectional Encoder Representations from Transformers (BERT), generative pre-trained transformers (GPT), Pathways Language Model (PaLM), Large Language Model Meta AI (LLaMA), CRATE transformers, but any other suitable type of transformer architecture can be additionally or alternatively used. Transformer weights are preferably known but can alternatively be only partially known or completely unknown.

Transformers can be trained to replicate any suitable behavior. In a first variant, a transformer is trained to replicate a particular task (e.g., performed by a human, performed by a program, etc.). In a second variant, a transformer is trained to replicate all or a subset of capabilities of a program. In this variant, the transformer can be generated from the program code directly, program pseudocode, a program representation, a transformer representation, input/output pairs associated with the program, user feedback, and/or can be otherwise generated. In a third variant, a transformer is trained on a set of data of a type distinct from the data on which the transformer is configured to run. In an example, a transformer is trained to perform a first task and is used to perform a second task not represented in training data for the transformer. In a fourth variant, a transformer can be trained to replicate the behavior of a user performing a task or set of tasks. However, transformers can replicate any other suitable behavior.

Transformers can include language transformers (e.g., BERT, GPT, text-to-text transfer transformer [T5], Transformer-XL [XLNet], robustly-optimized BERT approach [ROBERTa], a lite BERT [ALBERT], distilled BERT [DistilBERT], Enhanced Representation through kNowledge IntEgration [ERNIE], etc.), vision transformers (e.g., ViT, data-efficient image transformers [DeiT], Swin transformers, convolutional vision transformers [CvT], multimodal transformers (e.g., contrastive language-image pre-training), DALL-E, VisualBERT, VideoBERT, encoder-only transformers, decoder-only transformers, encoder-decoder transformers, long range transformers, sparse transformers, and/or transformers of any other suitable type of transformer architecture.

However, transformers can otherwise be configured.

Transformers can optionally be represented as transformer representations. A transformer representation functions to abstractly represent attributes and/or functionality of the transformer. A transformer representation can be generated by a transformer representation module 200 and/or any other suitable system component. A transformer representation can be generated in S120, S310, S400, S500, and/or any other suitable step. Attributes of the transformer can include architecture, weights (e.g., attention weights, feed-forward weights, etc.), hyperparameters (e.g., number and arrangement of layers, number and arrangement of heads, hidden layer size, feed forward network size, number of attention heads, etc.), parameters, connections, layer normalization parameters, training hyperparameters (e.g., learning rate, batch size, number of epochs, etc.), tokens (e.g., CLS tokens, SEP tokens, MASK tokens, etc.), token embeddings, intermediate representations (e.g., hidden states output from intermediate layers, etc.), attention maps, and/or any other suitable attributes of the transformer. Attributes of the transformer can optionally include encodings of any of the aforementioned attributes. A transformer representation can preferably be determined by the transformer representation module 200 but can alternatively be received (e.g., from a provider hosting the transformer) and/or be determined by any other suitable entity. A transformer representation can be generated from a transformer but can alternatively be used to generate a transformer and/or can otherwise have any other suitable relationship to a corresponding transformer. Conversions between the transformer and corresponding transformer representation can be lossy or lossless. A transformer representation can represent one transformer, multiple transformers, and/or can otherwise be related to transformers. Each transformer can be associated with one or more transformer representations. Different transformer representations can represent different aspects of the transformer, represent the transformer for different domains or applications, represent the same transformer in different ways, and/or otherwise differ or be related.

A transformer representation can be a graph, a set of weight matrices (e.g., store weights connecting neurons between layers), an activation map, a feature visualization, a code representation (e.g., for the transformer itself; for example, PyTorch code, pseudocode, etc.), a set of equations (e.g., including weights, biases, activation functions, etc.), and/or can take any other suitable form. Additionally or alternatively, a transformer representation can be an encoding and/or embedding of any of the aforementioned forms of transformer representations or transformers.

In a first example, a transformer representation can include a graph. In this example, graph nodes can correspond to (e.g., represent information about) layers, heads, parallel branches, operations, and/or any other suitable attribute of a transformer. In this example, graph edges can correspond to connections between layers and/or any other suitable attribute of a transformer. In this example, graph parameters (e.g., of edges and/or nodes) can correspond to layer weights, layer parameters, activation functions, matrices, layer type, and/or any other suitable attribute of a transformer. Any of the aforementioned information represented in the graph can be encoded or unencoded. In a specific example, the layer type is one-hot encoded.

In a second example, a transformer representation includes an encoding of transformer weights, connections, metadata, and/or other attributes of a transformer. Additionally or alternatively, a transformer representation can include a set of encodings (e.g., where each layer, head, and/or other transformer elements are encoded separately).

In a third example, a transformer representation includes code (e.g., pseudocode, implementation code, etc.). In this example, the transformer representation can be the code used to generate the transformer, code inferred to be similar to the code used to generate the transformer, and/or code otherwise related to the transformer.

However, the transformer representation can be of any other suitable type.

The transformer representation can be represented in plain text, JSON, YAML, protobuf, ONNX, a code representation (e.g., PyTorch, TensorFlow, etc.), and/or any other suitable format.

However, a transformer representation can otherwise be configured.

Programs (e.g., "classical programs", etc.) function to perform a task given a prompt. A prompt can be or include: text, images, video, audio, signals, 3D measurements (e.g., point clouds, geometric models, etc.), code, and/or any other suitable modality. Programs can be determined in S110, S330, S340, and/or in any other suitable step. Programs can be determined by a user, by a mapping model 300, by a training program generation module, by an output program generation module 400, a code refactoring model, and/or any other suitable system component. The programs predicted by the mapping model 300 from a source transformer can: generate the same (or similar) output as the source transformer (e.g., replicate a set of input-output functionalities of the transformer, etc.); mimic the logical processes of the source transformer (e.g., mimic how the transformer arrived at an output), preserve the qualities of the transformer, preserve the alignment of the transformer, and/or be otherwise related to the source transformer. Programs can include a set of instructions (e.g., explicit instructions, etc.), a sequence of coded commands, and/or any other suitable type of program element. Programs are preferably static (e.g., not adaptable; not automatically updated given more training data; etc.) but can alternatively be adaptable or otherwise characterized. Programs can include hard-coded variables, soft-coded variables, and/or any other suitable type of variable. Programs are preferably semantic but can alternatively be non-semantic or otherwise characterized. Programs are preferably deterministic but can alternatively be non-deterministic or otherwise characterized. Programs preferably include explicit instructions, but can alternatively not include explicit instructions. Programs are preferably discrete but can alternatively be non-discrete or otherwise characterized. Programs are preferably human-readable (e.g., and define human-interpretable algorithms, etc.) but can alternatively not be human-readable or can be otherwise characterized. Programs can be specific to a particular task, applicable to a variety of tasks, or can be otherwise characterized. Examples of programs include sorting, search, encryption, text processing, operating systems, application software, games, utilities, web applications, embedded systems, and/or any other suitable type of program. Programs can be written in a single language but can alternatively be written in multiple languages. However, programs can be otherwise configured.

Each transformer can be associated with one or more programs. Different programs associated with a transformer can differ in: task (e.g., one for math, one for code generation, one for text generation, one for image generation, etc.); domain (e.g., text interpretation, image generation, etc.); programming language; and/or otherwise differ. The different programs can be generated using different mapping models 300 (e.g., trained using different training data; specialized for different tasks or domains; etc.); generated using different prompts (e.g., wherein the mapping model 300 is prompted to generate a program biased toward, specific to, more accurate for, and/or otherwise specialized for a task or domain); and/or otherwise generated.

Programs can optionally be represented as program representations. A program representation functions to represent the abstract structure of a program; alternatively, the program representation can be in the program itself. A program representation can be generated by a mapping model 300, a program representation module 500, and/or any other suitable system component. A program representation can be generated in S110, S120, S330, S400, S500, and/or during any other suitable step. A program representation can represent the organizational structure of a program, a syntactical structure of a program, the functionality of a program, and/or any other suitable attribute of a program. A program representation is preferably distinct from a transformer representation, but can alternatively overlap with a transformer representation, can be the same as a transformer representation, and/or can be otherwise related to the transformer representation. A program representation preferably represents one program but can alternatively represent multiple programs or can be otherwise characterized. A program representation preferably retains all information about the corresponding program but can alternatively be simplified or more detailed (e.g., a program representation can include generated program analyses). Each program can be associated with one or more program representations. Different program representations can represent different aspects of the program, represent the same program in different ways, and/or otherwise differ or be related.

A program representation can include an encoding, a graph (an abstract syntax tree [AST], control flow graph [CFG], program dependence graph, data flow graph, etc.), a series of tokens, a series of embeddings, a RASP program, pseudocode, an intermediate representation (e.g., between machine code and source code), binaries, a symbolic execution, a state machine, and/or any other suitable type of representation. In an example where an abstract syntax tree is used, each node can represent a construct occurring in the text. Abstract syntax trees are tree representations of the abstract syntactic structure of text or code written in a formal language, where each node of the tree denotes a construct occurring in the text. ASTs can be used in better interpreting the transformers after program conversion for a deeper and augmented understanding. A program representation preferably represents data in a different format from a transformer representation but can alternatively represent data in the same format and/or be otherwise characterized. A program representation can optionally include a representation of the importance of different program elements.

However, a program representation can be otherwise configured.

Figure 5B:
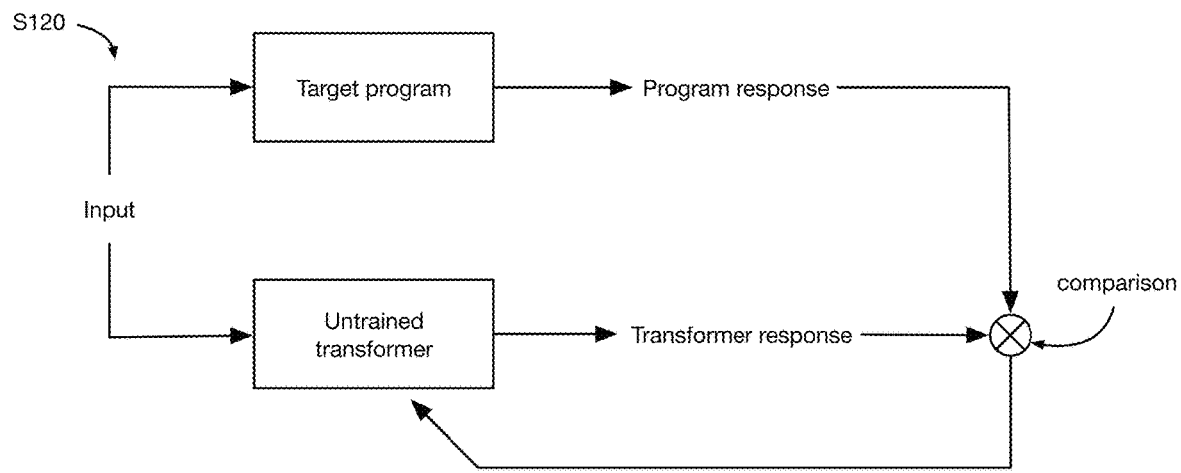

The transformer generation module 100 functions to determine a transformer from a program (e.g., performs S120). The transformer generation module 100 can generate a transformer from a program, from a program representation, from a set of input-output pairs corresponding to a target program (e.g., example shown in FIG. 5B), from a different transformer, and/or from any other suitable information. The transformer generation module 100 can include machine learning (ML)-based or non-ML-based methods. The transformer generation module 100 can optionally include a module which converts standard programs (e.g., python, etc.) into RASP programs (and/or any other suitable type of program or program representation which can be compiled into transformers, etc.). In an example, the module can convert sequences into sequence operators, can convert matrices into selectors, and/or can perform any other suitable conversions. The transformer generation module 100 can optionally include a module which converts program representations and/or transformer representations into transformers (e.g., a decoder, a graph neural network [GNN], etc.). The transformer generation module 100 can perform any of the methods described in S120. In a first variant, the transformer generation module 100 converts a RASP program into a transformer (e.g., by compilation, by mapping RASP operations into transformer components, etc.). In a second variant, the transformer generation module 100 trains a vanilla transformer on input-output pairs generated using a program. However, the transformer generation module 100 can otherwise generate transformers.

However, the transformer generation module 100 can otherwise be configured.

The transformer representation module 200 functions to convert a transformer and/or information about a transformer into a representation of the transformer. The transformer representation module 200 preferably performs S310 (e.g., during mapping) but can alternatively perform S120 (e.g., generating training data for the mapping model 300), and/or any other suitable step. The transformer representation module 200 can ingest attributes of a transformer, encoded attributes of a transformer, user preferences, and/or any other suitable information. The transformer representation module 200 can output a transformation representation (e.g., encodings, graphs, etc.) and/or any other suitable output. The transformer representation module 200 can use ML-based methods, heuristics, rule-based methods, and/or any other suitable methods. In variants where ML-based methods are used, the transformer representation module 200 can include a trained model. In a first example, the trained model can be trained using transformers (and/or attributes thereof) as input and a graph representation of the transformer (and/or attributes thereof) as a training target. In this example, the training target can be manually- or automatically-generated. In a second example, the transformer representation module 200 can be trained alongside the mapping model 300 as an encoder-decoder model. In this example, the transformer representation module 200 can be trained using transformers (and/or attributes thereof) as input and an encoding of a target program as training target. In this example, the encoding of the target program is the training input of the mapping model 300, and the training target of the mapping model 300 can include a program and/or program representation. However, the trained model can otherwise be configured. The trained model can include an encoder, can include a graph neural network (GNN), and/or can have any other suitable architecture. Examples of other architectures for the trained model include graph transformers, transformer encoders, graph attention transformers, attention-based models, matrix factorization models, tensor factorization models, and/or any other suitable type of architecture. In a variant, the transformer representation module 200 can be trained to generate code describing graph relationships (e.g., written in graphviz, etc.) which can optionally be human-interpretable. However, a graph relationship-generating transformer representation module 200 can be otherwise configured.

However, the transformer representation module 200 can be otherwise configured.

The mapping model 300 functions to determine a program and/or program representation from a transformer and/or transformer representation. The mapping model 300 preferably performs substeps of S300 (e.g., S330) and/or any other suitable steps. The mapping model 300 can ingest a transformer (e.g., attributes of a transformer, etc.), a transformer representation, user preferences, and/or any other suitable inputs. The inputs can be extracted from transformers (e.g., weights, attributes of a transformer, etc.), can be calculated from extracted values, can be determined by a transformer representation module 200, can be determined by a user, and/or can be otherwise determined. The transformer represented by the input to the mapping model 300 is preferably larger than the mapping model 300 (e.g., in terms of layer count, parameter count, etc.) but can alternatively be the same size or smaller than the mapping model 300. In variants with multiple mapping models 300, a mapping model 300 can be selected for transformers twice the mapping model's size, 10 times the mapping model's size, 100 times the mapping model's size, 1,000 times the mapping model's size, 10,000 times the mapping model's size, within an open or closed range bounded by any of the aforementioned values, and/or any other suitable value. The output of the mapping model 300 can be a program, a program representation, and/or any other suitable output.

The mapping model 300 can have any suitable combination of inputs and outputs. In a first variant, the mapping model 300 ingests a transformer representation and outputs a program (e.g., directly). In a second variant, the mapping model 300 ingests a transformer representation and outputs a program representation. In this variant, the mapping model 300 directly predicts the program representation based on the transformer representation. In an example of this variant, the mapping model 300 is a graph neural network (GNN) which ingests a graph representation of a transformer and outputs a graph representation (e.g., an abstract syntax tree, etc.) of a program. In a third variant, the mapping model 300 ingests a transformer (and/or attributes thereof) and directly predicts a program based on the transformer. However, the mapping model 300 can use any other suitable pairing of formats of inputs and outputs.

The mapping model 300 can include a single model and/or multiple models. Examples of possible models that can be used include Text-to-text models, graph neural networks (e.g., graph attention networks, etc.), encoders, decoders (e.g., T5, etc.), transformer-based models (e.g., GPT models, Codex, BERT), generative transformers, program synthesis models, pre-trained code models (e.g., PLBART, CodeT5, etc.), recurrent neural networks (RNNs), deep neural networks (DNNs, networks including a plurality of hidden layers, etc.; such as transformers, CNNs, RNNs, GANs, etc.), Seq2Seq2 networks (e.g., LSTM-based or transformer-based networks, etc.), and/or any other suitable type of model. The mapping model 300 preferably non-deterministically determines a program from a transformer (and/or representations thereof), but can alternatively deterministically determine a program from a transformer (e.g., determine the same program for a given transformer every time). The nondeterministic mapping model can be: probabilistic (e.g., leverage probabilities and/or randomness when determining the program); concurrent (e.g., concurrently predict multiple versions of the program; leverage a race condition to determine a program; etc.); using a nondeterministic search space; and/or leverage other nondeterministic methodologies.

Figure 9A:
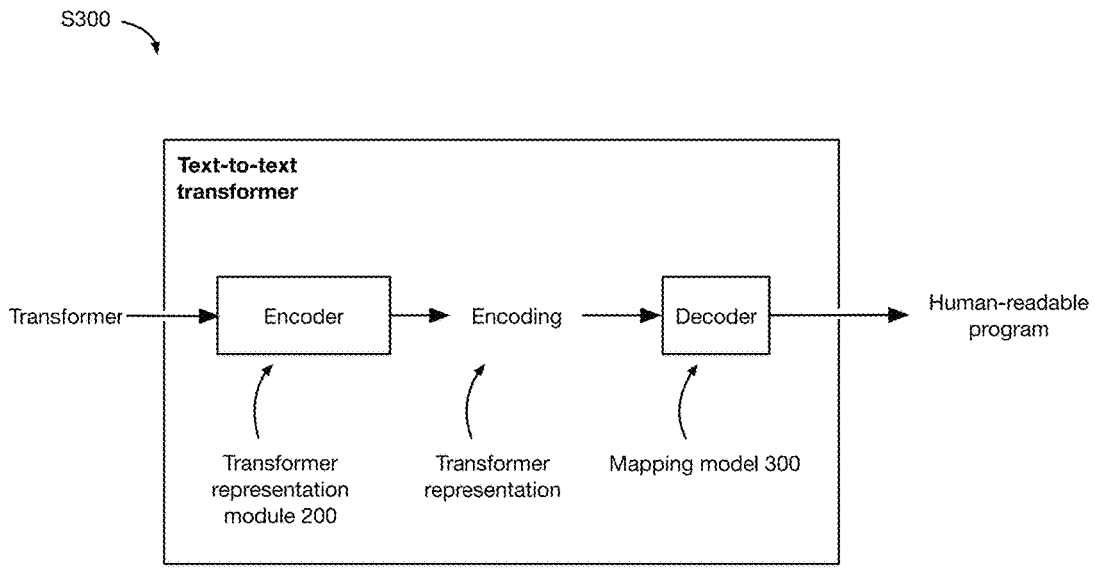
FIGS. 9A-9D are illustrative examples of variants of S300.
Figure 9B:
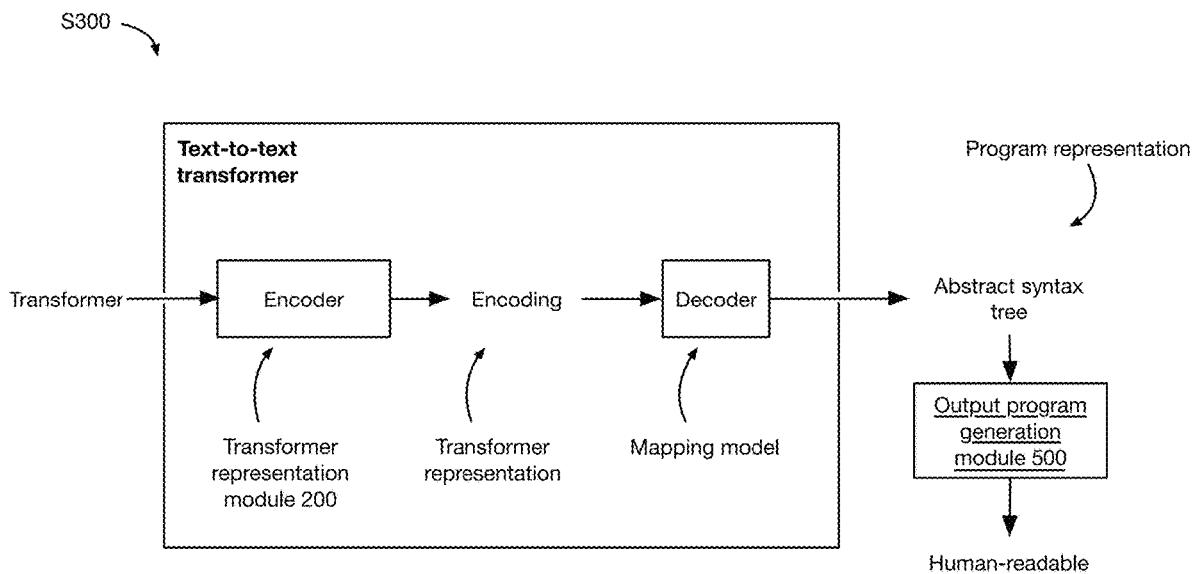
Figure 9C:
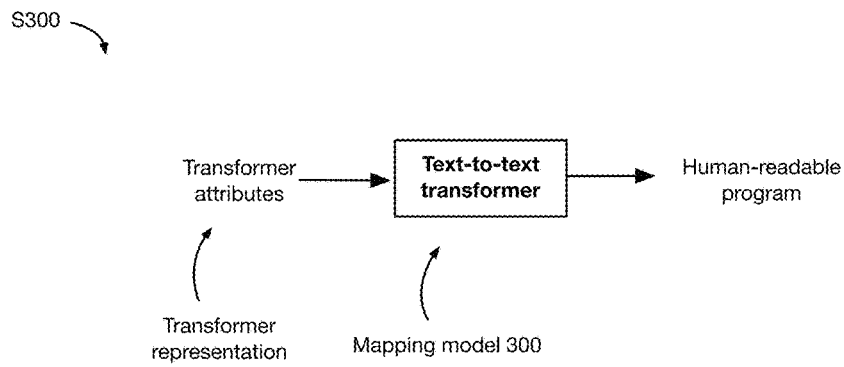
Figure 9D:
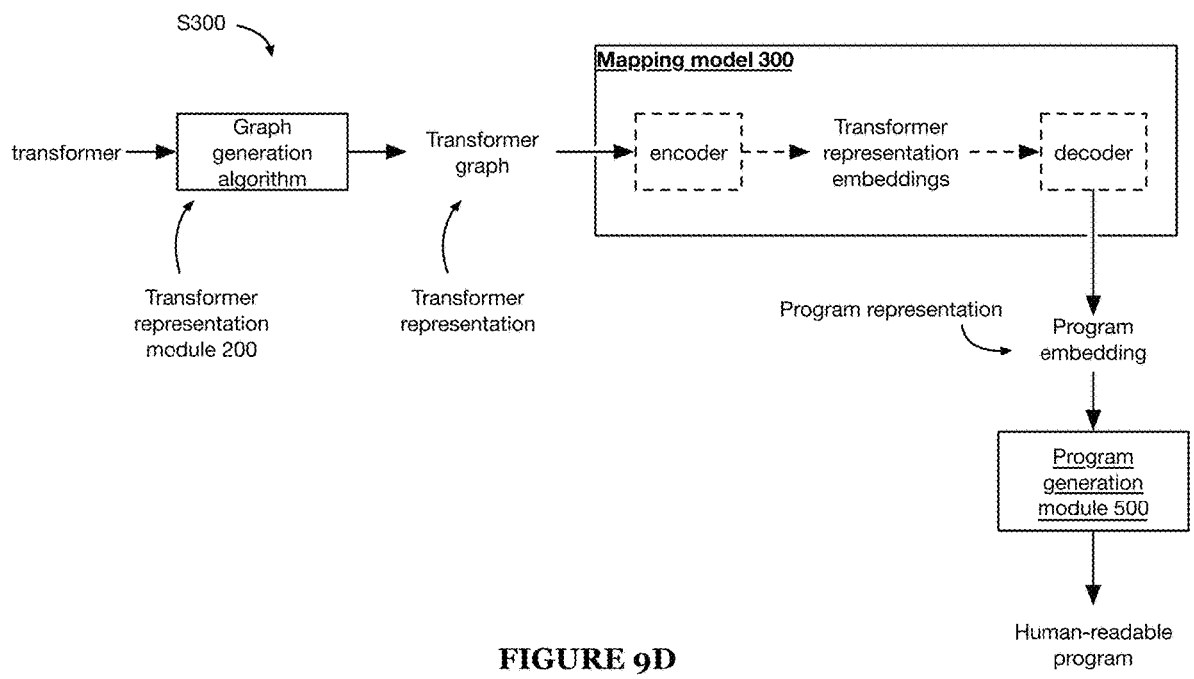

In a first variant, the mapping model 300 includes a decoder configured to decode a transformer embedding (e.g., embedding of a graph transformer representation, embedding of transformers weights and connections, etc.) into a program or representation thereof. In a first example, the mapping model 300 includes the decoder of a text-to-text model (e.g., T5, etc.; example shown in FIG. 9A and FIG. 9B). In a second example, the mapping model 300 includes a graph attention network (GAT) encoder-decoder which converts a graph representation of a transformer into a graph representation of a program (e.g., example shown in FIG. 9D).

In a second variant, the mapping model 300 includes a neural network (e.g., RNN, GAN) configured to predict a program or representation thereof based on a transformer representation (e.g., embedding or graph representation). In a first example, an RNN can incrementally predict the next token in a program based on the transformer representation. In a second example, the generator of a GAN trained on the training data (e.g., training transformer-target program pairs) can create the program given a transformer representation. In a third example, a DNN can predict a series of code snippet embeddings (e.g., numerical representations) from the transformer representation. In a fourth example, a T5 network can convert attributes of a transformer into code (e.g., example shown in FIG. 9C). However, the mapping model 300 can be otherwise constructed.

The mapping model 300 can be trained and/or tuned based on training data (e.g., determined using methods described in S200), feedback (e.g., evaluations of generated program outputs and/or mapping model outputs), and/or other information. Feedback can include automatically-generated program analyses (e.g., determined in S300, S500, etc.), automatically-generated evaluation metrics from the mapping model 300 (e.g., determined in S600, etc.), user-generated feedback (e.g., determined in S300, S500, etc.), and/or any other suitable type of feedback. Training targets can include programs (e.g., the programs used to generate the training transformers, synthetic programs, generated programs, received programs, modified programs [e.g., refactored programs from S500], etc.), and/or other information as training targets. Training inputs can include user preferences, training transformers (e.g., synthetic transformers, generated transformers, received transformers, etc.), representations thereof, and/or attributes thereof, and/or any other suitable training inputs. The mapping model 300 is preferably trained in S200 but can additionally or alternatively be trained at any other suitable time. In an example, the mapping model 300 is fine-tuned when the program fails an evaluation in S500 (e.g., responsive to an evaluation of quality preservation, inclusion preservation, and/or another metric meeting a predetermined threshold, etc.). In a first specific example, the output of a more complex mapping model 300 can be used as the ground truth training target to train the mapping model 300. In a second specific example, the output of a mapping model 300 with the highest inclusion preservation score and/or highest quality preservation score is used as the ground truth training target to train the mapping model 300. However, the mapping model 300 can otherwise be trained.

The system can include multiple mapping models 300 or a single mapping model 300. In variants with multiple mapping models 300, each mapping model 300 can optionally be specific to a transformer type, a task, a domain, a program domain, an input modality (e.g., transformer attributes, transformer representation, etc.), an input size (e.g., number of layers, number of parameters, etc.), and/or any other suitable characterization of inputs and/or outputs.

However, the mapping model 300 can otherwise be configured.

The optional program generation module 400 (output program generation module) functions to generate a program based on a program representation. The output program generation module 400 preferably performs the methods described in S340 but can additionally or alternatively perform any other suitable methods. The output program generation module 400 can ingest a program representation (e.g., determined by a mapping model 300), user preferences, and/or any other suitable information. The output program generation module 400 preferably outputs a program (e.g., a human-readable, compilable program, etc.), but can additionally or alternatively output pseudocode and/or any other suitable output.

The output program generation module 400 can have any suitable ML-based or non-ML-based architecture. In a first variant, the output program generation module 400 includes an encoder-decoder (e.g., which encodes a program representation and decodes the resulting encoding, etc.). In a second variant, the output program generation module 400 includes a decoder only (e.g., where the program representation includes an encoding, etc.). In a third variant, the output program generation module 400 includes non-ML methods (e.g., parsing, template-based code generation, etc.). In an example, the output program generation module 400 includes a mapping between a text token (e.g., predicted by the mapping model 300) into text (e.g., a function call, a variable name, etc.). In a fourth variant, the output program generation module 400 includes a compile( ) function and/or a code generator (e.g., which converts an abstract syntax tree into a program, etc.). However, the output program generation module 400 can have any other suitable architecture. Examples of ML-based architectures that can be used as the output program generation module 400 include a Graph2Seq architecture, Graph2Text architecture, GAT2Text architecture, T5 architecture, BART architecture, and/or any other suitable type of architecture. In ML-based variants, the output program generation module 400 can be trained on various training inputs to predict a target program and/or any other suitable information. In a first variant, a training input is a program representation (e.g., output from a mapping model 300). In a second variant, a training input is a transformer representation (e.g., output from a transformer representation module 200). In a third variant, a training input is a RASP version of a target program (e.g., where the target program is or is converted into a RASP program, etc.). However, any other suitable training input can be used. Alternatively, the output program generation module 400 can include a pretrained model.

However, the output program generation module 400 can be otherwise configured.

The models discussed herein (e.g., mapping model 300, transformer generation module 100, transformer representation module 200, output program generation module 400, etc.) can include classical or traditional approaches, machine learning approaches, and/or be otherwise configured. The models can include regression (e.g., linear regression, non-linear regression, logistic regression, etc.), decision tree, latent semantic analaysis (LSA), clustering, association rules, dimensionality reduction (e.g., principal component analysis (PCA), t-distributed Stochastic Neighbor Embedding (t-SNE), linear discriminant analysis (LDA), etc.), neural networks (e.g., CNN, DNN, creative adversarial network (CAN), long short-term memory (LSTM), RNN, encoders, decoders, deep learning models, transformers, etc.), ensemble methods, optimization methods, classification, rules, heuristics, equations (e.g., weighted equations, etc.), selection (e.g., from a library), regularization methods (e.g., ridge regression), Bayesian methods (e.g., Naiive Bayes, Markov), instance-based methods (e.g., nearest neighbor), kernel methods, support vectors (e.g., support vector machines (SVM), support vector classifier (SVC), etc.), statistical methods (e.g., probability), comparison methods (e.g., matching, distance metrics, thresholds, etc.), deterministics, genetic programs, and/or any other suitable model. The models can include (e.g., be constructed using) a set of input layers, output layers, and hidden layers (e.g., connected in series, such as in a feed forward network; connected with a feedback loop between the output and the input, such as in a recurrent neural network; etc.; wherein the layer weights and/or connections can be learned through training); a set of connected convolution layers (e.g., in a CNN); a set of self-attention layers; and/or have any other suitable architecture. The models can extract data features (e.g., feature values, feature vectors, etc.) from the input data, and determine the output based on the extracted features. However, the models can otherwise determine the output based on the input data.

Models can be trained, learned, fit, predetermined, and/or can be otherwise determined. The models can be trained or learned using: supervised learning, unsupervised learning, self-supervised learning, semi-supervised learning (e.g., positive-unlabeled learning), reinforcement learning, transfer learning, Bayesian optimization, fitting, interpolation and/or approximation (e.g., using gaussian processes), backpropagation, and/or otherwise generated. The models can be learned or trained on: labeled data (e.g., data labeled with the target label), unlabeled data, positive training sets (e.g., a set of data with true positive labels, negative training sets (e.g., a set of data with true negative labels), and/or any other suitable set of data.

Any model can optionally be validated, verified, reinforced, calibrated, or otherwise updated based on newly received, up-to-date measurements; past measurements recorded during the operating session; historic measurements recorded during past operating sessions; or be updated based on any other suitable data.

Any model can optionally be run or updated: once; at a predetermined frequency; every time the method is performed; every time an unanticipated measurement value is received; or at any other suitable frequency. Any model can optionally be run or updated: in response to determination of an actual result differing from an expected result; or at any other suitable frequency. Any model can optionally be run or updated concurrently with one or more other models, serially, at varying frequencies, or at any other suitable time.

However, the method can be used with any other suitable set of components.

4. Method

In variants, the method functions to convert transformer models into programs that can be characterized and/or analyzed using program analysis techniques. The method can include generating mapping model training data S100, determining the mapping model S200, predicting a program based on a transformer S300, optionally evaluating the mapping model S400, optionally running analyses on the program S500, optionally utilizing the program and/or generated program analyses S600, and/or any other suitable steps.

The method can be performed by the system described above, or by any other system. All or portions of the method can be performed: when a transformer identifier is received (e.g., as part of a user request to convert the transformer into one or more programs); when a transformer update is identified; when a user request to run a transformer-derived program is received; and/or at any other time. All or portions of the method can be performed in real time (e.g., responsive to a request), iteratively, concurrently, asynchronously, periodically, and/or at any other suitable time. All or portions of the method can be performed automatically, manually, semi-automatically, and/or otherwise performed.

Figure 2:
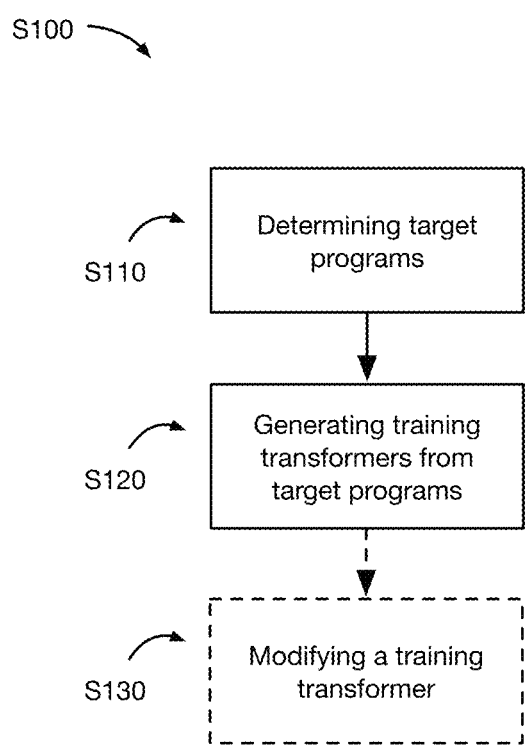
FIG. 2 is a schematic representation of a variant of S100.

Generating mapping model training data S100 functions to generate a corpus of training transformer-target program pairs. S100 can be performed by the transformer generation module 100, a training program generation module, and/or any other suitable system components. S100 can be performed responsive to a user command, automatically, and/or responsive to any other suitable condition. S100 is preferably performed before S200 but can alternatively be performed at any other suitable time. S100 can include determining target programs S110, generating training transformers from target programs S120, optionally modifying a training transformer S130, and/or any other suitable processes (e.g., example shown in FIG. 2).

Determining target programs S110 functions to generate target programs for use as training targets for training the mapping model 300. Target programs can be generated, received, scraped, predetermined and received from a third party, randomly-generated, synthesized (e.g., to be similar to a primary program, automatically generated by a model based on a prompt, etc.), combined (e.g., containing other programs, appended to other programs, etc.), and/or otherwise determined. In an example, target programs are generated which are similar to a user-selected program. Target programs can optionally be merged with one another, or otherwise transformed. In a first variant, target programs can be appended to one another to form a new parent target program. In a second variant, target programs are nested within one another (e.g., wherein a parent target program includes a child target program, etc.). S110 can be performed manually, automatically, and/or otherwise performed. Target programs can be sourced from a particular domain, can be general, and/or can be otherwise characterized. Target programs can be of a particular type (e.g., RASP, Python, etc.), of varied types, and/or can be otherwise characterized.

However, determining target programs S110 can be otherwise performed.

Generating training transformers from target programs S120 functions to generate transformers which have similar overall functionality to target programs. S120 is preferably performed by a transformer generation module 100 but can alternatively be performed by another suitable system component. A target program can be converted into a training transformer using: a set of rules (e.g., to combine layers or sub-models in a predetermined configuration), a set of heuristics, and/or other methods. Training transformers can be determined from a "primed" base transformer, a blank base transformer, a different transformer (e.g., trained to perform a different task, etc.), and/or another type of base transformer. In variants where a "primed" base transformer is used, the base transformer can be pre-trained on tasks within the program domain, tasks outside the program domain, and/or any other suitable tasks. S120 can include determining a single transformer or multiple transformers corresponding to a program. In variants where multiple transformers are determined, each transformer can have the same or different architectures, hyperparameters (e.g., ranging in size, etc.), parameters, generation methodologies, and/or any other suitable attribute of a transformer. Such attributes (e.g., hyperparameters, generation methodologies, architectures, size, etc.) can be assigned (e.g., manually-input by a user), calculated (e.g., based on a complexity of a program, etc.), randomly-generated, sampled (e.g., from the distribution of transformers used in S300, from a distribution of commercial transformers, etc.), and/or otherwise determined. Alternatively, the same attributes can be used for all training transformers or a subset of training transformers. Transformers can be generated from a single program or from multiple different programs. In variants where multiple programs are used, the multiple programs can be sourced from the same domain or different domains. However, transformers can otherwise map to programs.

Transformers can be generated in a variety of ways. In a first variant, a transformer can be generated by training a transformer on input-output pairs generated using a target program. In a second variant, a transformer can be generated by compiling a target program into a training transformer (e.g., where the target program is designed to be converted into a transformer, etc.). In an example, a RASP program is used. In a second example, a target program in a different language can be converted into a RASP program using a compiler, interpreter, transpiler, or other source-to-source translation tool, wherein the RASP program can be used to generate the training transformer (and the target program can be used as the training target in S200). In a third example, a transformer can be generated from code (e.g., PyTorch code, etc.). In a third variant, a target program is converted into a solution format convertible into a transformer (e.g., a program representation, etc.). In a fourth variant, an existing transformer corresponding to the target program is modified (e.g., in S130). In a fifth variant, a transformer is generated manually (e.g., using a set of rules—for example, combining layers and/or submodels in a predetermined configuration, using heuristics, etc.). In a sixth variant, the transformer can be non-deterministically generated from a program (e.g., using a neural network, a DNN larger than the transformer, a neural network that probabilistically predicts segments, such as layer sets, of the transformer, etc.). However, a transformer can be otherwise generated.

However, generating training transformers from target programs S120 can be otherwise performed.

Modifying a training transformer S130 functions to change a transformer to substantially match (e.g., within a predetermined threshold) or approximate a distribution in a target domain—for example, transformers used in S300. S130 can be performed on training transformers and/or any other suitable transformer. S130 can include ML-based or non ML-based methods. In a first variant, modifying a training transformer can include rotating and/or shuffling weights of the transformer. In a second variant, modifying a training transformer can include fine-tuning a transformer on input-output pairs. In a third variant, modifying a training transformer can include adding noise to a transformer (e.g., weights, connections between layers, etc.). In a fourth variant, modifying a training transformer can include compressing the transformer (e.g., reducing the number of parameters, layers, attention heads, etc.). In a fifth variant, modifying a training transformer can include composing the transformer with another transformer. In examples of this variant, transformers (e.g., fixed-length sequence to sequence models, etc.), can be composable. In a first example of this variant, a first transformer contains a second transformer and/or the functionality thereof. In a second example of this variant, a first transformer contains a second and third transformer, wherein the output of the second transformer is piped into the third transformer (e.g., as an input). In these examples, the resultant transformer can be associated with the programs used to generate the source transformers, wherein the programs can optionally be transformed or composed in the same way the source transformers were composed and/or transformed. In a sixth variant, modifying a training transformer can include altering the statistical distribution of the transformer weights. In a seventh variant, modifying a training transformer can include introducing sparsity optimization to change the shape and size of matrices. However, modifying a training transformer S130 can otherwise be performed.

In variants of S120 and/or S130 where input-output pairs are used to train and/or fine-tune a training transformer, the input-output pairs can be determined in a variety of ways. In a first embodiment, input-output pairs are generated by a target program (e.g., the target program corresponding to the training transformer, etc.). For example, inputs can be run through the target program to generate program outputs, wherein the resultant input-program output pair is used to generate the training transformer (e.g., the training transformer is trained to predict the program output based on the input). In variants, when a transformer is associated with a plurality of target programs, sets of input-output pairs can be generated using each target program of the plurality, wherein the transformer is trained on each set of input-output pairs. In a second embodiment, input-output pairs are generated by a different program from the target program corresponding to the training transformer. In a third embodiment, input-output pairs are input by a user (e.g., where a user manually determines an input and/or output, etc.). In a fourth embodiment, input-output pairs are received from a remote source. In a fifth embodiment, input-output pairs are determined from a set of corrected incorrectly-determined outputs each corresponding to an input and a target program (e.g., where training and/or fine-tuning is targeted towards tasks on which the training transformer performs poorly, etc.). However, input-output pairs can be determined by any other suitable entity in any suitable manner.

S100 can optionally additionally include storing the generated training transformers in association with: the target programs to which they correspond (e.g., with a target program identifier, a target program representation, the target program itself, etc.); a domain or task identifier (e.g., for the inputs of the input-output pairs; for the program; etc.); and/or any other suitable information.

However, generating mapping model training data S100 can be otherwise performed.

Determining a mapping model S200 functions to determine a model which is able to convert a transformer into a program with similar functionality to the transformer. S200 is preferably performed using the mapping model 300 but can alternatively be performed on another model. S200 can include training a mapping model 300 such that each program generated from a transformer using the mapping model 300 maintains the structure of the transformer, the input-output behavior of the transformer, and/or other attributes of the transformer.

S200 is preferably performed using the training transformers generated in S200 as training inputs, but can alternatively be performed using transformers input into prior iterations of S300 (e.g., using the mapping model-generated program as the training target), and/or other suitable transformers. S200 is preferably performed using the target programs generated in S200 as the training target, but can alternatively be performed using generated programs generated by a more advanced mapping model 300 in a prior iteration of S300, performed using the transformer input-output pairs as the training target (e.g., wherein the target program is inferred based on whether the predicted program's outputs substantially match the transformer's outputs, given the same input), and/or other suitable training targets.

S200 is preferably performed before using the mapping model 300 but can alternatively be performed while using and/or after using the mapping model 300 (e.g., based on user feedback, based on newly-determined training data, etc.). S200 can be performed once or multiple times (e.g., for mapping models of different sizes, mapping model architectures, types, training data distributions, training data compositions, input domains, output domains, input modalities, output modalities, input transformer architectures, output program architectures, etc.).

S200 can include training a mapping model 300 to output one target program from a training transformer, multiple target programs from a training transformer, one target program from multiple training transformers, multiple target programs from multiple training transformers, and/or any other suitable number of training transformer-target program correspondences. In an example, the mapping model 300 is trained to determine the original target program (and/or set thereof) used to generate the training transformer (and/or set thereof). In a specific example, the training data set can include a plurality of training transformers generated for a target program, wherein mapping model 300 can be trained to predict the target program given any of the training transformers. In another specific example, the training data set can include a training transformer and a plurality of target programs (e.g., used to generate the training transformer's training data), wherein the mapping model 300 can be trained to predict the target programs given the training transformer and optionally a constraint (e.g., the input, the input domain, etc.). In a specific example, the output of the mapping model 300 includes the hierarchy of target programs (e.g., parent/child program relationships). In this specific example, the hierarchy of target programs can be compared to a determined hierarchy generated from a training transformer (e.g., and/or representation thereof) as a part of S200.

Training inputs can include or can be determined from transformers generated in S120, other transformers, and/or include any other set of training inputs. Training inputs can optionally include user preferences. In an example, a user preference includes the relative importance of program functionality and alignment to the training input, program length, program interpretability, and/or any other suitable metric on which the output program and/or training input can be evaluated. In a first variant, attributes of a training transformer are used as a training input. In this variant, the attributes are extracted from the transformer, received from a third party, calculated, and/or otherwise determined and/or further processed. In a specific example, transformer weights are extracted from the transformer and used directly as training input. In a second variant, a transformer representation is used as a training input. In this variant, the transformer representation can be determined by the transformer representation module 200, received from a third party, generated from code and/or pseudocode used to generate the transformer (e.g., where the transformer representation includes or is generated from PyTorch code, etc.), and/or otherwise determined. The transformer representation can be determined during S120, S200, S300 (e.g., where training representations from prior iterations of S300 are used) and/or at any other suitable time. However, training inputs can be otherwise determined.

Training targets can include or can be determined from target programs determined in S110 (e.g., the ones used to generate the training transformers), but can alternatively be determined by correcting (e.g., manually, by a user; automatically, by a more complex mapping model 300, etc.) generated programs that were incorrectly predicted by a trained mapping model 300 in a prior iteration of S300, and/or can otherwise be determined.

Figure 6A:
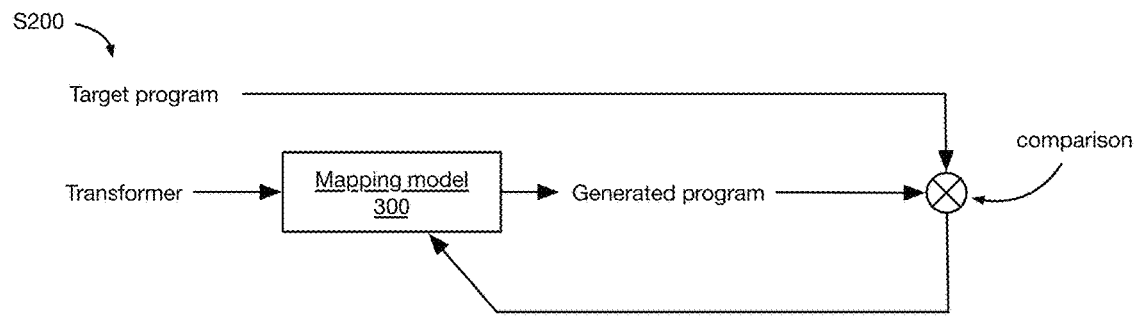
FIGS. 6A-6F are schematic representations of variants of S200.

In a first variant, the training target includes a target program (e.g., from S110, etc.; example shown in FIG. 6A). In this variant, one or more target programs can be used as training targets. In a first example, the training target is a set of target programs and the relationships between them (e.g., parent/child relationships, hierarchy, etc.). In a second example, multiple target programs are synthesized into one single target program which is used as a training target. However, a target program can otherwise be used as a training target.

Figure 6B:
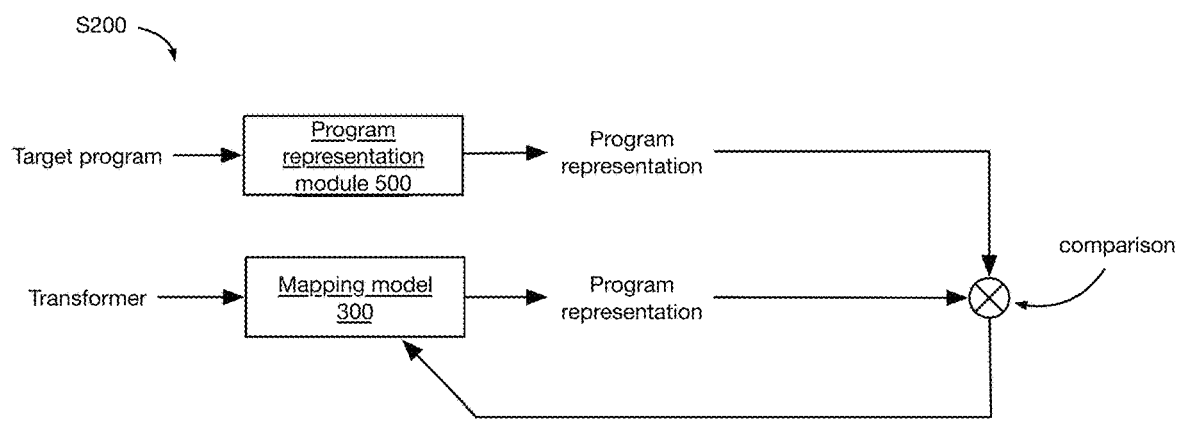
Figure 6C:
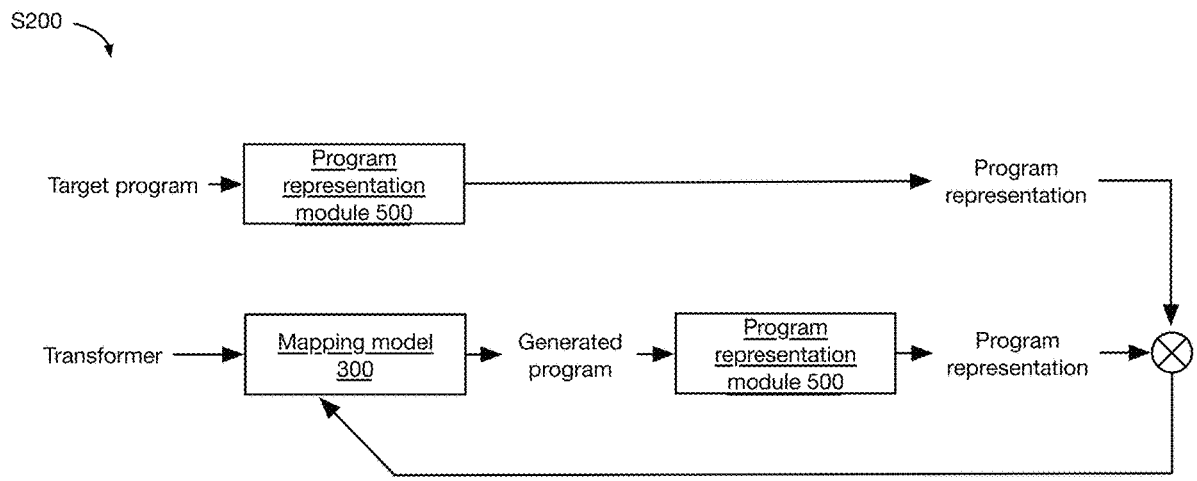

In a second variant, a program representation is used as a training target. In this variant, the mapping model 300 predicts a program representation. Preferably, the target program representations (e.g., training target of the mapping model 300 in this variant) are generated by a program representation module 500 (e.g., examples shown in FIG. 6C) but can alternatively be generated by any other suitable system component. The program representation module 500 can generate the program representation from a target program. The transformer representation is preferably generated by a transformer representation module 200 (e.g., example shown in FIG. 6B) but can alternatively be generated by any other suitable system component. In a first embodiment, the program representation module 500 can include abstract syntax tree (AST) generation methods (e.g., lexical analysis, parsing, etc.) applied to target programs in order to generate an abstract syntax tree (e.g., the program representation). In a second embodiment, the program representation module 500 can include control flow graph (CFG) generation methods (e.g., parsing the program, identifying blocks, constructing edges, linking blocks, etc.). In a third embodiment, the program representations can be intermediate encodings (e.g., wherein the output program generation module 400 is trained alongside the mapping model 300; thus the intermediate encodings are learned while training the mapping model 300 and output program generation module 400 together). In this embodiment, the mapping model 300 acts as the program representation module 500 while being trained.

However, training targets for the mapping can otherwise be determined.

Figure 4:
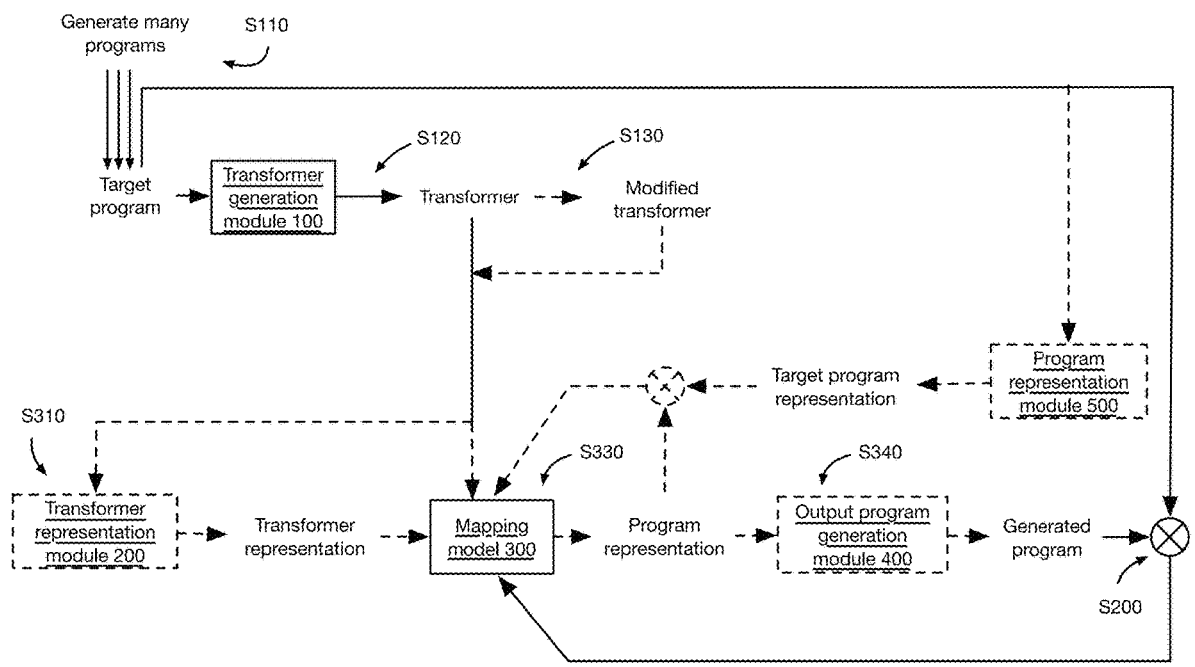
FIG. 4 is a schematic representation of an illustrative example of a variant of the method.

Loss can be determined from programs and/or program representations output from the mapping model 300 during training (e.g., example shown in FIG. 4) and/or generated program outputs (e.g., generated program responses). The loss function for training the mapping model 300 can include mean squared error (MSE), mean absolute error (MAE), Huber loss, syntax error loss, tree edit distance (TED), functional correctness-based losses (e.g., semantic error loss, execution trace alignment loss, output divergence loss, behavioral constraint loss), diversity loss, combined loss functions, and/or any other suitable loss function. However, the mapping model 300 can be otherwise trained.

Loss can be determined from a user-generated and/or automatically-generated evaluation of a mapping (e.g., an evaluation metric).

In a first variant, loss can be a function of a comparison of the generated program to the target program (and/or a comparison of a generated program representation to a target program representation). In a first example of this variant, loss can include a similarity of respective program representations (e.g., representations output from the mapping model 300 and/or representations determined from generated programs output from the mapping model 300, etc.). In a specific example, a program representation is an abstract syntax tree, and loss is determined from the target program representation and output program representation using graph comparison methods. In a second example of this variant, loss can include program token overlap. In a third example of this variant, loss can include expression overlap. In a fourth example of this variant, loss can include calculating a similarity of relationships of different generated programs and/or representations thereof to the relationships between target programs and/or representations thereof associated with the training transformer. In a fifth example of this variant, loss can include an inclusion preservation score for the generated output (e.g., generated programs and/or program representations). In this example, inclusion preservation refers to how well the generated output maintains the internal hierarchy of the input (e.g., input transformer and/or transformer representation). In this example, inclusion preservation can be determined using any of the methods described in S400. However, the generated program (and/or representation thereof) and target program (and/or representation thereof) can be otherwise compared.

Figure 6D:
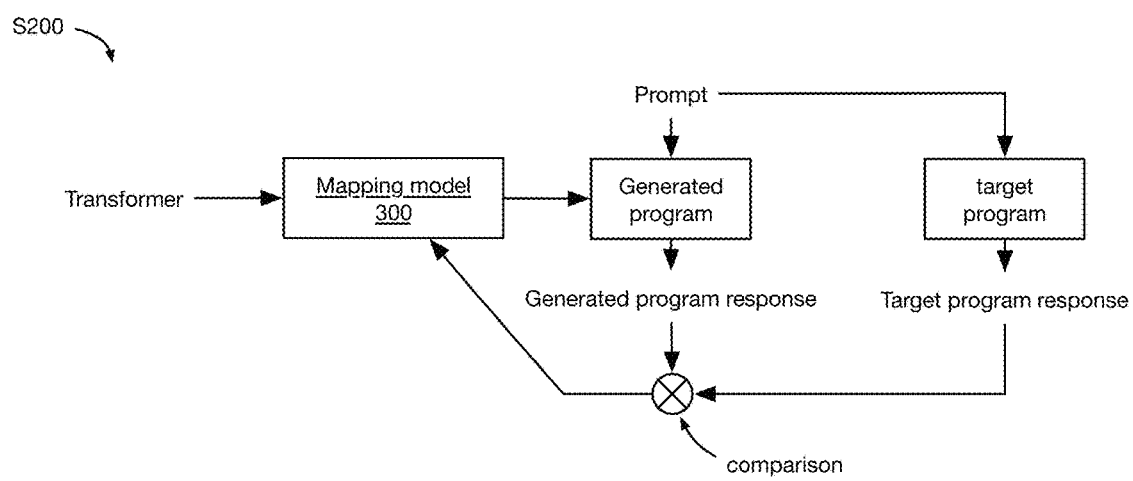
Figure 6E:
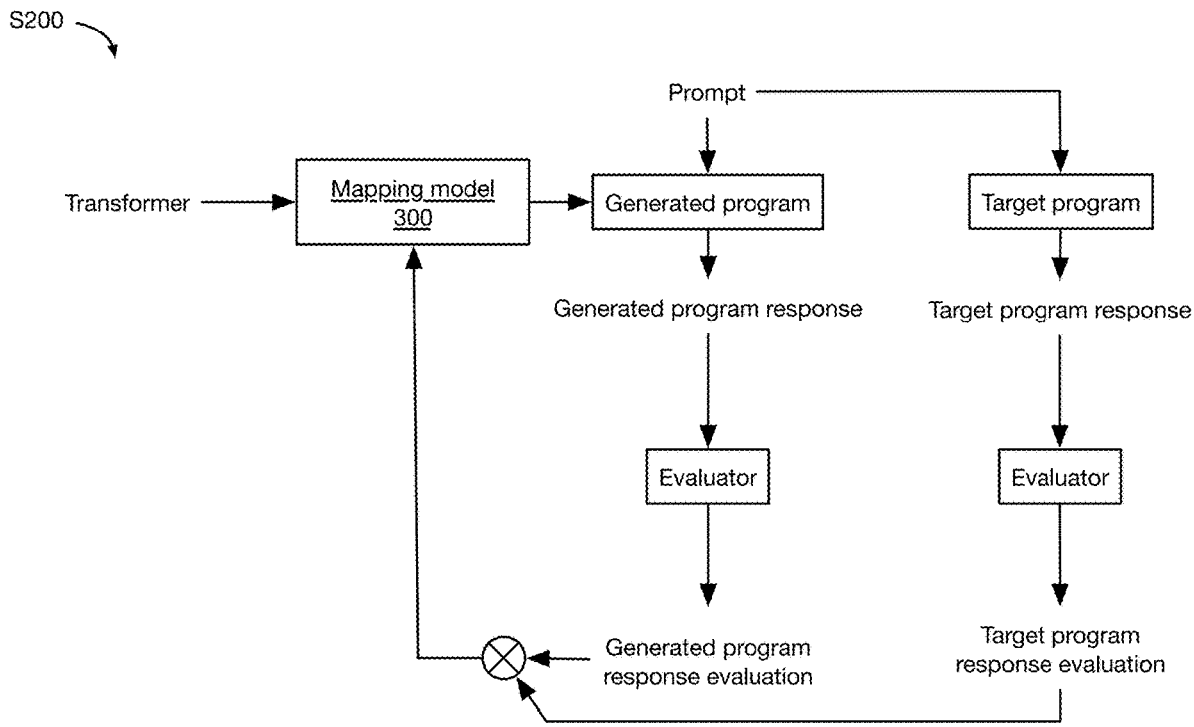

In a second variant, loss can include a comparison of outputs of a generated program to outputs of a target program. In a first example of this variant, loss can include the similarity of outputs given the same prompt (e.g., example shown in FIG. 6D). In a second example, loss includes a metric similarity score (e.g., quality similarity score) for the generated program. In this example, similarity refers to how well outputs of generated programs match the quality of target programs with respect to a particular metric (e.g., example shown in FIG. 6E). In a specific example, the metric can be determined using any of the methods described in S400 (e.g., the metric can be inclusion preservation, quality preservation, etc.). In a second specific example, the metric can be determined by a "reward model" as described in in U.S. patent application Ser. No. 18/800, 900, filed Aug. 12, 2024 and titled PROMPT ROUTING SYSTEM AND METHOD, incorporated herein in its entirety by this reference, which claims the benefit of U.S. Provisional Application No. 63/532,199 filed 11 Aug. 2023, U.S. Provisional Application No. 63/588,591, filed 6 Oct. 2023, and U.S. Provisional Application No. 63/598,879 filed 14 Nov. 2023, each incorporated herein in its entirety by this reference. However, outputs of the generated program and outputs of the target program can be otherwise compared.

Figure 6F:
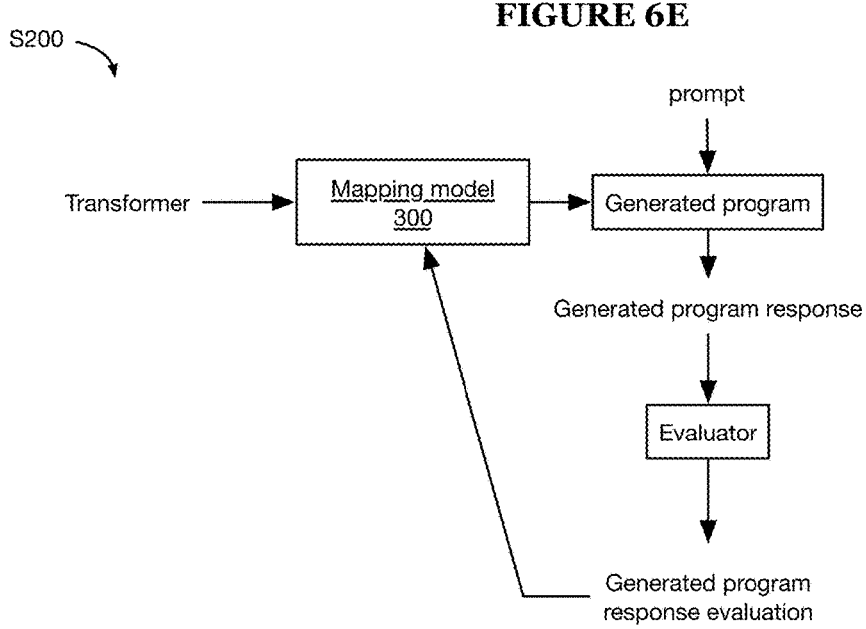

In a third variant, loss can include an evaluation of the mapping model output (e.g., the generated program; example shown in FIG. 6F). In this variant, the evaluation can include determining an explainability of the generated program, determining an average computational cost for the generated program, and/or any other suitable metric. In this variant, the mapping model 300 can be trained to generate a high-performing (e.g., cheap, explainable, etc.) program with or without regard for the target program. In this variant, metrics can be determined using any of the methods described in S500 and/or the aforementioned second variant.

In a fourth variant, loss can include an evaluation of outputs of the generated program. In this variant, the evaluation can include determining an accuracy, a user satisfaction, a relevance to the training input, and/or any other suitable attributes of the generated program outputs. In this variant, metrics can be determined using any of the methods described in S500.

However, loss can be based on any other suitable information.

In variants, where multiple programs (and/or representations thereof) are output by the mapping model 300, loss can be based on all mapping model outputs, a single mapping model output, and/or any other suitable subset of mapping model outputs. In examples, the loss function can be based on the lowest-performing output (e.g., least similar to the training target, lowest performance score, etc.), highest-performing output, median output, average output, and/or any other suitable output or calculation derived from outputs and/or training targets. However, the loss function can be otherwise characterized.

However, determining a mapping model S200 can otherwise be performed.

Figure 3:
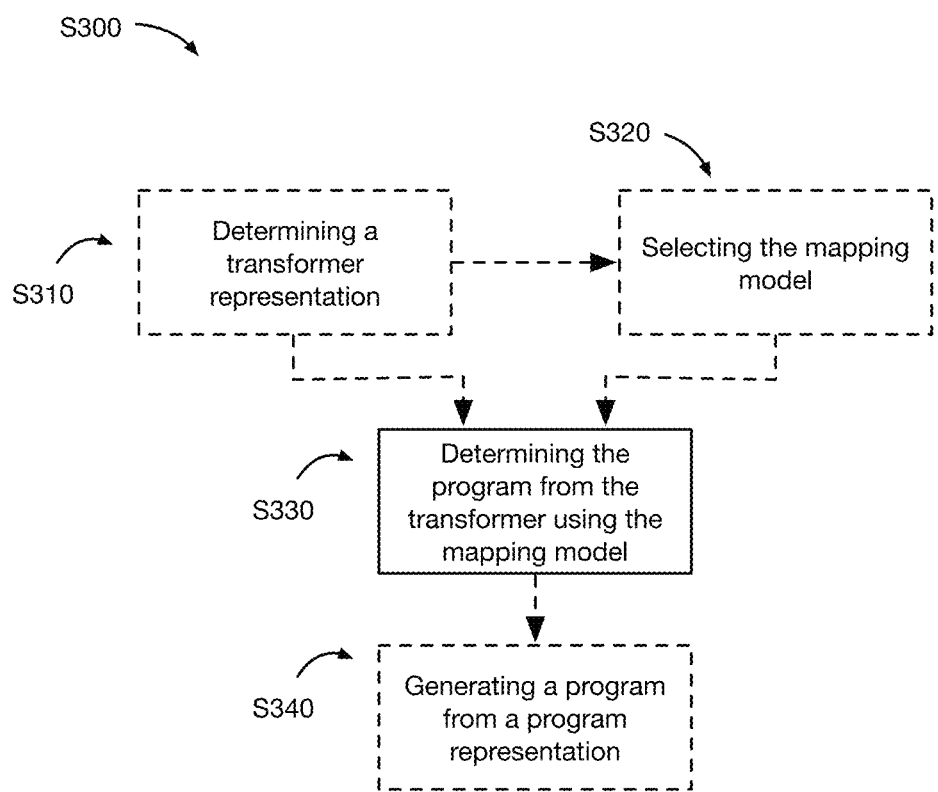
FIG. 3 is a schematic representation of a variant of S300.

Predicting a program based on a transformer S300 functions to convert a transformer (or another neural network model) into a program. S300 can include optionally determining a transformer representation S310, optionally selecting the mapping model S320, determining the program from the transformer using the mapping model S330, optionally generating a program S340 and/or any other suitable steps (e.g., example shown in FIG. 3). S300 is preferably performed by the mapping model 300, but can additionally or alternatively be performed by the transformer representation module 200, the output program generation module 400, and/or any other suitable system component. S300 can be performed multiple times per transformer (e.g., generating programs at varying levels of complexity; generating programs for a subset of transformer functionalities, etc.), once per transformer, and/or any other suitable number of times. S300 can be performed responsive to receiving information about a transformer (e.g., a reference to a transformer, attributes of a transformer, etc.), and/or responsive to any other suitable event. In an example, S300 can be performed when a new transformer is identified (e.g., in a user request, from a transformer provider publication, etc.). S300 and/or substeps of S300 can optionally be performed using user parameters received alongside the information about a transformer, stored user parameters, user parameters from another suitable source, but can alternatively be performed without using user parameters.

S300 is preferably performed for transformers outside of the training transformer set (e.g., determined in S100), but can alternatively be performed for transformers within the training transformer set. The transformers used in S300 can be constrained to those that implement human-interpretable algorithms, transformers that implement human-uninterpretable algorithms, unconstrained, and/or otherwise constrained. The program generation process can be unconstrained, or be constrained (e.g., constrained inputs, etc.). The transformers used in S300 preferably cannot be deterministically mapped to a program (e.g., the mapping model

300 probabilistically generates the programs from a transformer), but can alternatively be deterministically mapped to a program.

Optionally determining a transformer representation S310 functions to convert the transformer into a format ingestible by the mapping model 300. The format can be standardized to the mapping model 300 (e.g., between different transformer architectures) but can alternatively be standardized for a transformer architecture, standardized for another system attribute, or not standardized. S310 is preferably performed by the transformer representation module 200 but can alternatively be performed by another suitable system component. S310 is preferably performed once at a time but can alternatively be performed multiple times (e.g., generating multiple transformer representations for a transformer). In a first example, attributes of the transformer (e.g., transformer weights, hyperparameters, etc.) are encoded. In this example, the resulting encoding can be the transformer representation. In a second example, attributes of the transformer (e.g., layers, parameters, connections between layers, etc.) are converted into attributes of a graph (e.g., graph nodes, parameters, edges, respectively, etc.). However, determining a transformer representation S310 can be otherwise performed.

Figure 7:
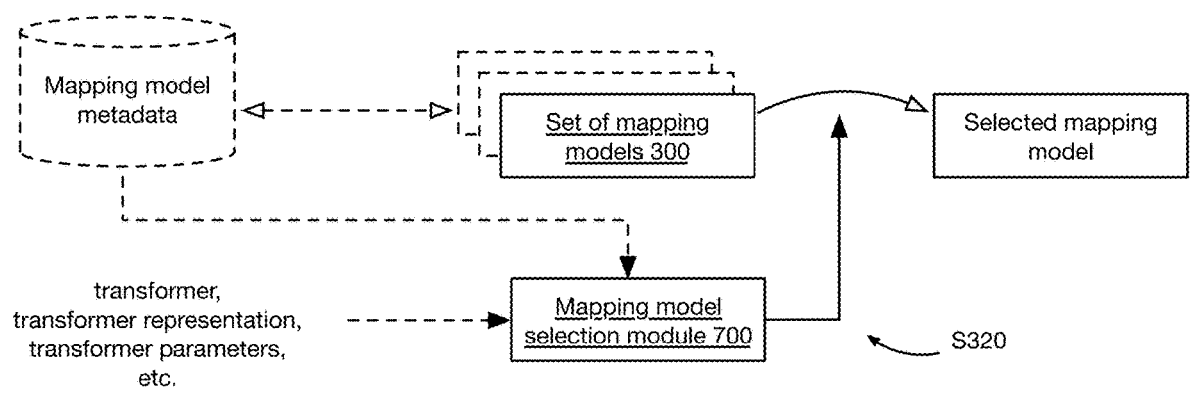
FIG. 7 is a schematic representation of a variant of S320.

Optionally selecting a mapping model S320 functions to select a mapping model suitable for a given transformer (e.g., example shown in FIG. 7). S320 can be performed in variants where multiple mapping models 300 are generated, but can alternatively be performed in other contexts. S320 is preferably performed responsive to receiving the transformer and/or attributes of a transformer, responsive to a user command, and/or responsive to any other suitable condition. S320 is preferably performed by a mapping model selection module 700 but can additionally or alternatively be performed by any other suitable component. Selection of a mapping model 300 can be based on transformer attributes, transformer representation attributes, and/or mapping model attributes. In a first variant, the mapping model 300 can be selected based on transformer parameters (e.g., weights of the transformer and/or transformer representation, etc.). In a second variant, the mapping model 300 can be selected based on transformer hyperparameters (e.g., transformer architecture, transformer representation modality, etc.). In a third variant, the mapping model 300 can be selected based on a transformer size (e.g., a number of weights, layers, etc.). In a fourth variant, the mapping model 300 can be selected based on a transformer class (e.g., a predetermined class, a dynamically-determined class, etc.). In a fifth variant, the mapping model 300 can be selected based on the sizes of candidate mapping models 300 (e.g., parameter count, layer count, etc.). In a sixth variant, the mapping model 300 can be selected based on the architecture of candidate mapping models 300. In a seventh variant, the mapping model 300 can be selected based on aggregate generated program analyses (e.g., averaged generated program analyses, etc.) from programs generated using the mapping model 300 (e.g., program analyses generated in S500). In an eighth variant, the mapping model 300 can be selected based on evaluations (e.g., evaluation metrics determined in S400, etc.) of mapping models 300. In a ninth example, the mapping model 300 can be selected based on a desired domain or task for the predicted program (e.g., wherein the desired domain or task is specified by the user, inferred from a transformer or program input, etc., wherein different candidate mapping models can be specific to different domains or tasks (e.g., trained to predict programs for the given domain or task). However, the mapping model 300 can be selected based on any other suitable information or combination of information. In a specific example, the mapping model 300 is selected based on the size of the mapping model 300 meeting a predetermined condition relative to the size of the transformer (e.g., the mapping model 300 being 10% the size of the transformer, etc.). Mapping models 300 can be the same or different for different transformer architectures, different transformer representation modalities, different input sizes (e.g., transformer sizes, transformer representation sizes, etc.), different classes, and/or any other suitable distinction or set of distinctions between inputs.

Mapping model selection can additionally or alternatively be based on user parameters (e.g., a desired similarity of the generated program to the transformer, a preferred mapping model 300, etc.). Preferably, a single mapping model 300 is selected, but alternatively any other suitable number of mapping models 300 can be selected. S320 can be performed automatically or manually (e.g., wherein a user picks a mapping model 300; wherein the mapping model 300 is specified in the user preferences, etc.). In an example, mapping models 300 are run in parallel or in order of increasing complexity (e.g., size, etc.) until a mapping (e.g., generated program) of sufficient quality (e.g., inclusion preservation, quality preservation, etc.) is generated. Alternatively, a single mapping model 300 is available which is used for transformers and/or transformer representations with varying attributes.

However, selecting a mapping model S320 can be otherwise performed.

Figure 8A:
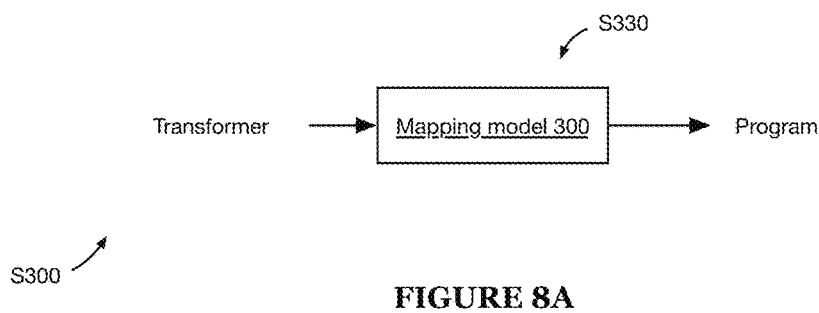
FIGS. 8A-8B are schematic representations of variants of S300.
Figure 8B:
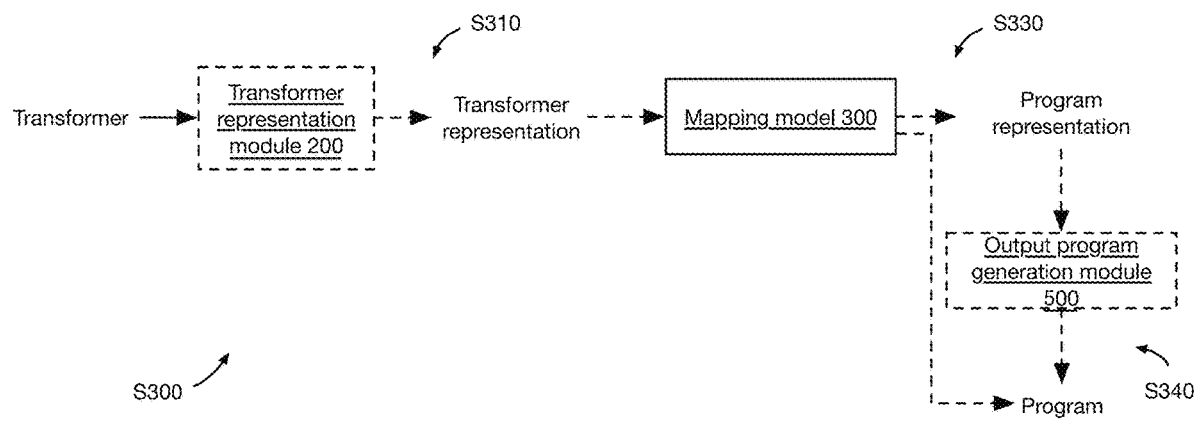

Determining the program from the transformer using the mapping model S330 functions to convert a transformer and/or representation thereof into a program. S330 is preferably performed by a mapping model 300 (e.g., a trained mapping model 300 from S200, a selected mapping model 300 from S320, etc.; example shown in FIG. 8A), but can additionally or alternatively be performed by another suitable mapping model 300 and/or system component. Determining the program can include predicting, inferring, decoding, aggregating (e.g., aggregating a set of sub-programs using a set of rules), and/or otherwise determining a program. S330 is preferably performed when transformer information (e.g., attributes of a transformer, attributes of a transformer representation, a reference to a transformer, etc.) is received, when a transformer conversion request is received, after a mapping model 300 is selected in S320, and/or at any other suitable time. S330 can be performed based on the transformer, transformer representation, user parameters, and/or any other suitable input (e.g., example shown in FIG. 8B). S330 can include generating programs, program representation, relationships between programs, and/or any other suitable output. S330 can include generating one program, generating one program at a time, generating multiple programs without merging them, generating multiple programs and merging them, generating a merged program, and/or any other suitable way to generate information describing a program. In variants where multiple programs are generated, the multiple programs can perform the same task and/or different tasks. In variants where the multiple programs perform the same tasks, S330 can include determining a mechanism to vote on outputs of the multiple programs, determining a mechanism to combine (e.g., average) the outputs of the multiple programs, voting on the multiple programs to select a program, and/or otherwise reconciling the multiple programs with one another. S330 can be performed once per transformer or multiple times per transformer (e.g., wherein each time S330 is run, a new program is generated, etc.).

In an example, the mapping model 300 receives a transformer representation and converts the transformer representation into a program representation. In this example, the mapping model 300 can encode the transformer representation into a latent space (e.g., using an encoder) and/or receive an encoding representation of a transformer, then decode the encoding into a program representation and/or program. Alternatively, the decoder can map the encoding into a program embedding space and/or decode the resulting embedding into a program representation and/or program. Alternatively, a program and/or program representation can be otherwise predicted.

However, determining the program from the transformer using the mapping model S330 can be otherwise performed.

Figure 10:
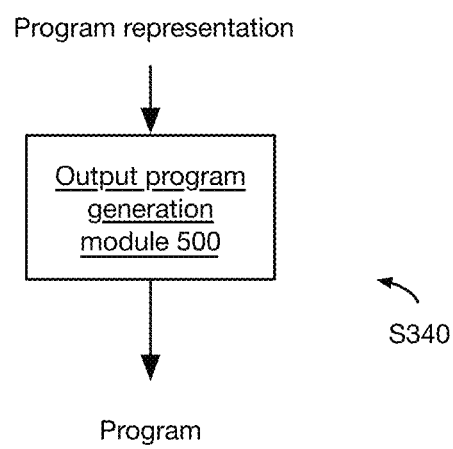
FIG. 10 is a schematic representation of a variant of S340.

Optionally generating a program from a program representation S340 functions to convert a program representation into a program (e.g., example shown in FIG. 10). S340 is preferably performed by the output program generation module 400 but can alternatively be performed by another suitable component. S340 can include generating programs in a variety of ways. In a first variant, generating a program can include converting a program representation into a program. In this variant, generating a program can include using a neural network (e.g., a GAT, decoder, etc.) a rule-based method (e.g., parsing, etc.), and/or any other suitable method to generate a program. In a second variant, generating a program can include editing the program. In this variant, generating the program can include running the program and detecting errors (e.g., compilation errors, runtime errors, etc.), analyzing the program code, and/or any other suitable form of program editing. In a third variant, generating a program can include translating an existing program (e.g., from and/or into RASP, python, etc.). However, S340 can include other methods for generating a program.

However, generating a program from a program representation S340 can be otherwise performed.

After S300 is performed, the set of generated programs can be stored alongside a reference to the corresponding transformer. Alternatively, a reference to the transformer can be stored alongside a reference to the corresponding programs. The set of generated programs can be stored locally, stored remotely, transmitted, and/or otherwise processed. In an example, a third party hosting a transformer transmits transformer attributes to the processing system running S300 and receives the generated programs and/or a reference to the generated programs in return. In this example, the third party can elect when to use their transformer and when to use a generated program (e.g., wherein the generated program is used by sending a request to the processing system hosting the generated programs, etc.). In an example, the transformer can be associated with multiple sets of programs, each set of programs varying relative to each other in quality, cost, alignment with the transformer (e.g., inclusion preservation, quality preservation, etc.), domain, task, and/or any other suitable metric.

However, predicting a program based on a transformer S300 can be otherwise performed.

Evaluating the mapping model S400 functions to determine evaluation metrics for the mapping model 300. S400 can be performed during training, after training, and/or at any other suitable time. S400 can include using generated programs, generated program representations, evaluated outputs of the generated programs, metadata from S300 (e.g., program prediction time, consumed memory, etc.), transformer attributes, transformer representation attributes, and/or any other suitable information. In variants where generated programs are used to evaluate the mapping model 300, all or a subset of generated programs can be used for evaluation. In variants where a subset of generated programs are used, the subset can include the lowest-performing generated program in each group of multiple generated programs generated from a single transformer and/or another suitable subset of generated programs. The mapping model 300 can be evaluated relative to other mapping models 300, intrinsic qualities of the mapping model 300 can be determined, and/or evaluations can otherwise be characterized. Evaluation metrics can include metrics representing quality preservation, inclusion preservation, latency, performance metrics, and/or any other suitable metric for the mapping model 300 and/or outputs thereof.

Figure 11:
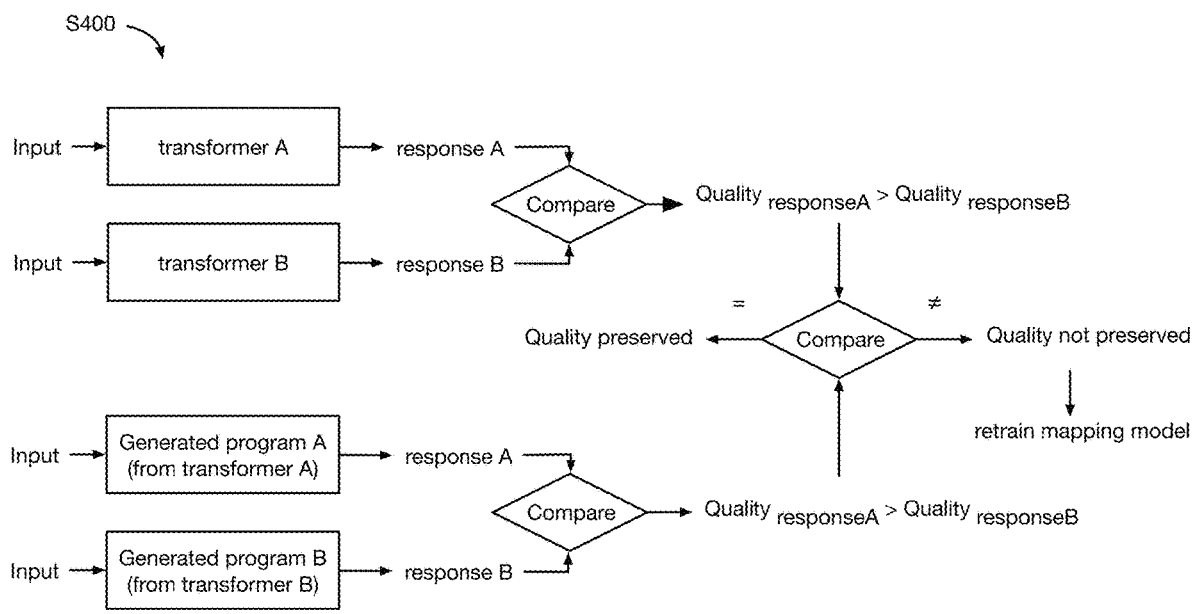
FIG. 11 is an illustrative example of a variant of S400.
Figure 12:
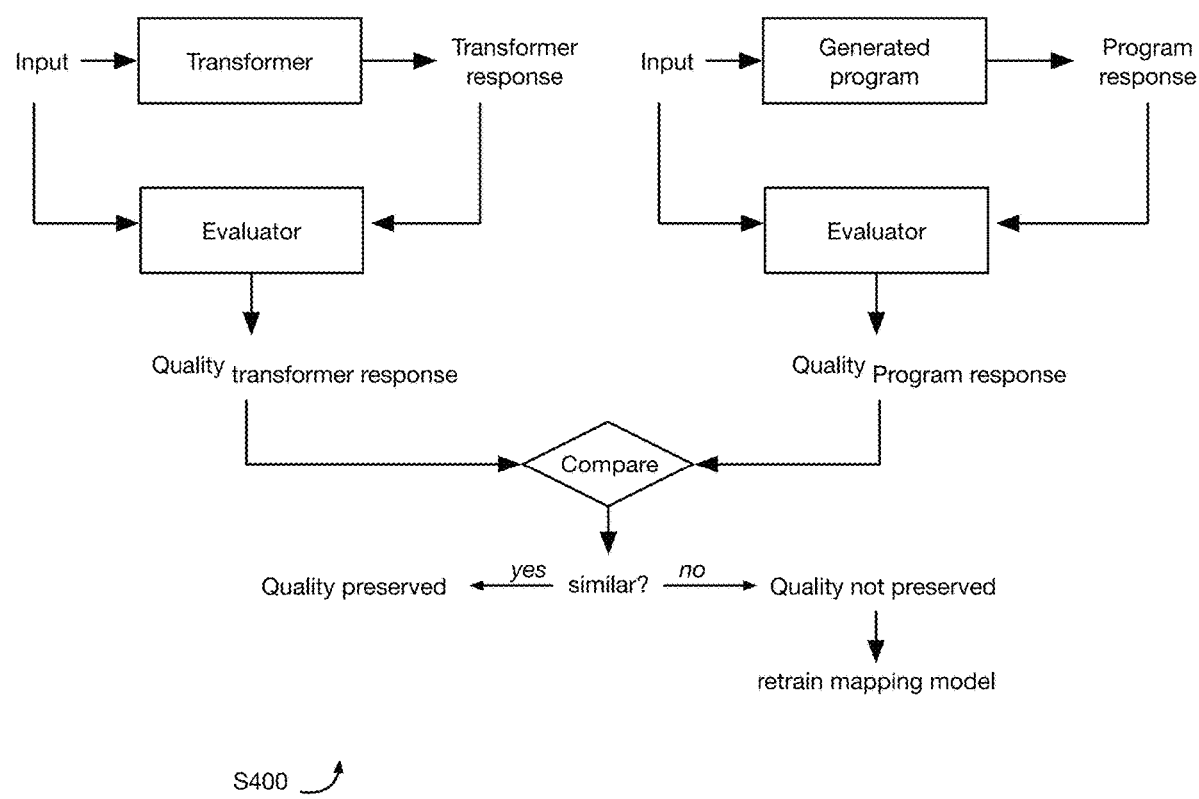
FIG. 12 is an illustrative example of a variant of S400.

Quality preservation functions to measure how well a mapping preserves properties of the transformer. Specifically, quality preservation measures how similar the quality of outputs of the generated program are to the quality of outputs of the transformer. In an example, quality preservation can be determined from a set of transformers, generated programs generated from the set of transformers, responses of the set of generated programs and transformers, evaluations of the responses of the set of generated programs, and/or any other suitable information (e.g., examples shown in FIG. 11 and/or FIG. 12).

In a first variant, relative quality between prompts is measured. In this variant, when the quality $Q_{TX1}$ for prompt $X_1$ input into transformer T is higher than the quality $Q_{TX2}$ for prompt $X_2$ input into transformer T, then the quality $Q_{PX1}$ for prompt $X_1$ input into generated program P (e.g., where generated program P is determined from transformer T) being higher than the quality $Q_{PX2}$ for prompt $P_2$ input into generated program P could result in a higher quality preservation score for the mapping model 300.

In a second variant, relative quality between transformers is measured. In this variant, when the quality $Q_{T1X}$ for prompt X input into transformer $T_1$ is higher than the quality $Q_{T2X}$ for prompt X input into transformer $T_2$, then the quality $Q_{P1X}$ for prompt X input into generated program $P_1$ (e.g., where $P_1$ is generated from $T_1$) being higher than the quality $Q_{P2X}$ for prompt X input into generated program $P_2$ (e.g., where $P_2$ is generated from $T_2$) could result in a higher quality preservation score for the mapping model 300.

In a third variant, quality preservation is based on the similarity of absolute quality measured for each prompt. In this variant, $Q_{T1X}$ being similar to $Q_{P1X}$ could result in a higher quality preservation score for the mapping model 300.

In a fourth variant, quality preservation is based on the similarity of absolute quality measured between generated programs. In this variant, if $Q_{T1X}$ is similar to $Q_{T2X}$, $Q_{P1X}$ being similar to $Q_{P2X}$ could result in a higher quality preservation score for the mapping model 300.

However, quality preservation can be based on any other suitable comparison or measurement of absolute quality.

Examples of quality can include BiLingual Evaluation Study (BLEU) score, Recall-Oriented Understudy for Gisting Evaluation (ROUGE), perplexity, entropy, relevance (e.g., of a response to a prompt), alignment, accuracy, precision, recall, latency, F1 score, mean absolute error (MAE), mean squared error (MSE), and/or any other suitable quality metric. Quality is preferably determined locally but can alternatively or additionally be determined by and received from a third party (e.g., a user, etc.). However, quality preservation can be otherwise characterized.

Figure 13:
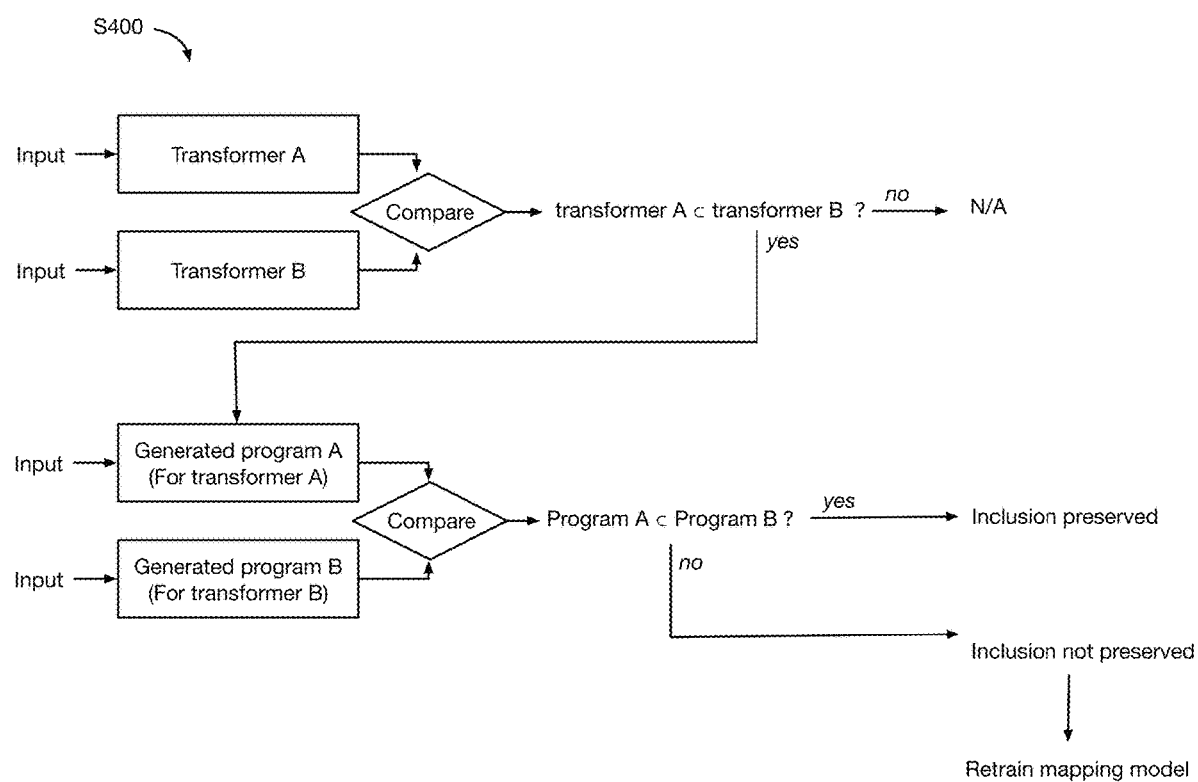
FIG. 13 is an illustrative example of a variant of S400.

Inclusion preservation functions to measure how well a program reflects the underlying functionality of a transformer. For a transformer $T_1$ which includes transformers $T_2$ and $T_3$, inclusion preservation can represent how whether (and/or how well) a program $P_1$ is includes of programs similar to $P_2$ and $P_3$ (e.g., wherein $P_2$ and $P_3$ are generated programs from transformers $T_2$ and $T_3$, respectively). Composition can include an element (e.g., a transformer, a program, a program representation, etc.) being appended to another element, an element being a parent and/or child of another element, an element being divided into a set of elements, and/or any other suitable type of composition. To calculate an inclusion preservation metric, programs, program representations, program outputs, and/or any other suitable values can be compared (e.g., example shown in FIG. 13).

In variants of determining inclusion preservation and/or quality preservation where similarity is used (e.g., determining a similarity of quality values, determining a similarity of programs, etc.), examples of methods to determine similarity include Euclidean distance, cosine similarity, Jaccard similarity, Kendall's Tau-B, graph isomorphism, subgraph isomorphism, graph edit distance, embedding similarity, matching methods (e.g., finding the largest common subgraph between two graphs), text-based methods (e.g., string, token matching), syntax-based methods (e.g., parsing abstract syntax trees), semantics-based methods (e.g., a program dependence graph representing data and control dependencies between statements in a program, etc.), and/or any other suitable methods to determine a similarity metric.

Evaluation metrics determined from quality preservation calculation methods, inclusion preservation calculation methods, methods to calculate other evaluation metrics (e.g., other quality metrics) can be stored alongside each generated program and/or program representation determined from the mapping model 300. Additionally or alternatively, a confidence score can be associated with the relationship between a generated program and a transformer. The stored evaluation metrics can affect how a program and/or transformer are used (e.g., in S600).

In variants, the mapping model 300 can be re-determined after mapping model evaluation (e.g., responsive to the evaluation metrics being below a particular threshold, etc.), but can alternatively not be re-determined. In variants, programs can be re-determined for a given set of transformers after mapping model evaluation (e.g., after re-training the mapping model 300) but can alternatively not be re-determined. In an example, a subset of programs associated with a mapping model evaluation metric below a threshold value (e.g., programs generated from a low-performing mapping model 300, etc.) can be redetermined when the mapping model 300 is updated. However, the mapping model 300 and/or programs determined therefrom can be otherwise re-determined or not re-determined.

However, evaluating the mapping model S400 can be otherwise performed.

Figure 15:
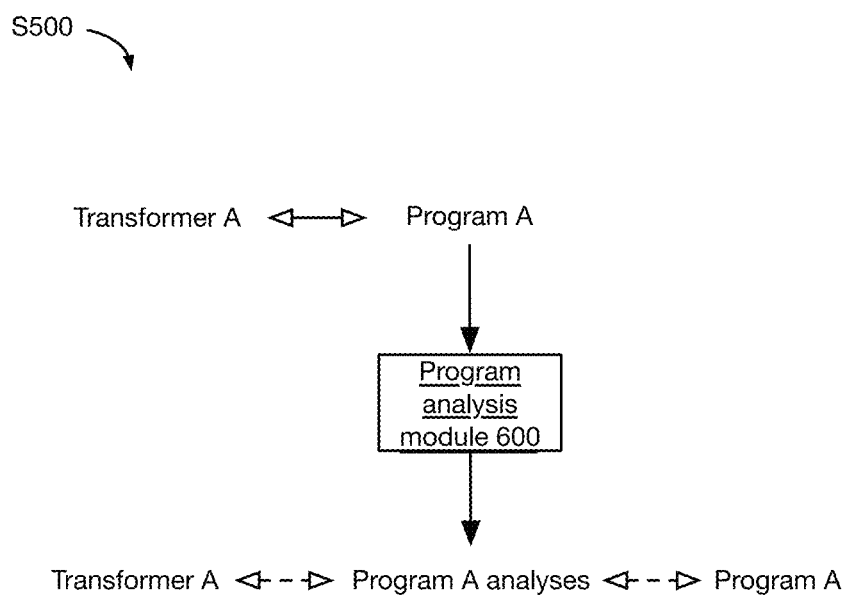
FIG. 15 is a schematic representation of a variant of S500.

Running analyses on the program S500 functions to utilize the generated program to determine information about the corresponding transformer (e.g., the transformer from which the generated program was determined). S500 is preferably performed by a program analysis module 600 but can additionally or alternatively be performed by any other suitable component. Generated program analyses in S500 can include features derived from programs and/or representations thereof, relationships between program and other programs, proofs of correctness, bias scores, errors, code chunks, quality scores (e.g., used in S400), performance scores (e.g., average quality, expressiveness, tone, complexity, size, accuracy, etc.), introspection results, explanations (e.g., by interpreting the algorithm embodied within code) and/or any other suitable information. In variants, the generated program analyses can be any of the variants of the "performance scores" and/or "metadata" described in U.S. patent application Ser. No. 18/800,900, filed Aug. 12, 2024 and titled PROMPT ROUTING SYSTEM AND METHOD, incorporated herein in its entirety by this reference, which claims the benefit of U.S. Provisional Application No. 63/532,199 filed 11 Aug. 2023, U.S. Provisional Application No. 63/588,591, filed 6 Oct. 2023, and U.S. Provisional Application No. 63/598,879 filed 14 Nov. 2023, each incorporated herein in its entirety by this reference. Generated program analyses can be determined based on programs, program representations, program outputs (e.g., responses), relationships between programs, and/or any other suitable information. In a specific example, S500 can include verifying whether a transformer is good at editing a program, and whether the transformer is capable of editing itself. If so, the program's task understanding increases drastically, as it can refactor itself and continuously self-improve (e.g., in a method analogous to reinforcement learning with human feedback (RLHF)). In variants, generated program analyses can be associated with the program and/or transformer from which the program was determined (e.g., example shown in FIG. 15).

S500 can include generating data, transforming generated programs and/or representations thereof, and/or any other suitable forms of analysis.

Figures 14A, 14B:
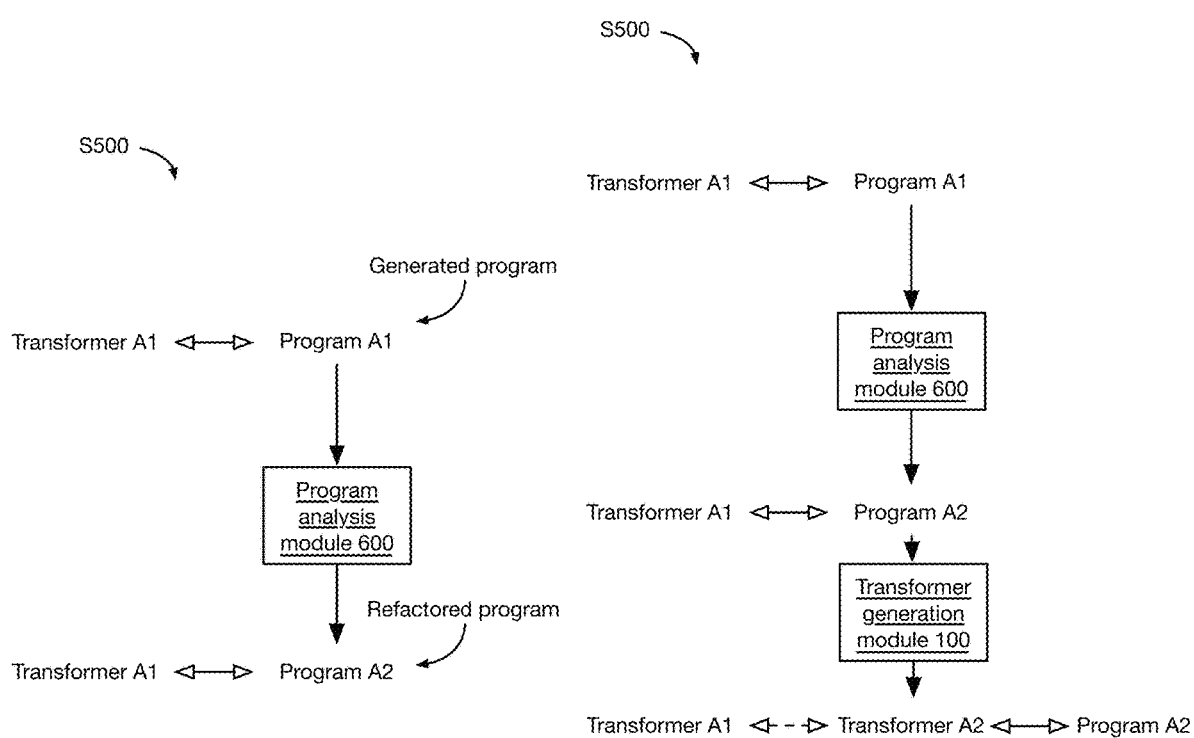
FIGS. 14A-14B are schematic representations of variants of S500.

In a first variant, S500 includes code refactoring (e.g., examples shown in FIG. 14A and FIG. 14B). In this variant, the program code can be refactored to improve readability. In examples, code can be refactored to make the functionality of the transformer legible to a user, to facilitate targeted manual program editing, to increase code quality, and/or for any other purpose. In this variant, the generated program code can be shortened, lengthened, and/or kept the same size.

In a second variant, the program and/or representation thereof can be presented to the user for debugging.

In a third variant, the generated program and/or representation thereof can be compared with other programs from the same transformer to evaluate operation consistency and/or task overlap.

In a fourth variant, a generated program can be analyzed to provide transformer and/or program explainability (e.g., to ascertain how a program generated an answer). For example, feature importance, LIME, SHAP, and/or other explainability methods can be applied to the program to explain how and/or why the program generated the output. In other examples, such analysis can include method citation (e.g., to enable communicating to the user which methods were used, etc.), data source citation (e.g., to enable communicating to the user which data sources were used, etc.), and/or other types of citation.

In a fifth variant, intermediate values (e.g., variable values) can be extracted from generated programs and used as inputs to other programs and/or transformers (e.g., wherein the program is used similarly to and/or in lieu of an encoder, etc.).

In a sixth variant, proofs of correctness can be generated and/or used to evaluate reliability and correctness of a program.

In a seventh variant, generated programs (e.g., and/or corresponding transformers) can be merged. Programs can be merged when: they are determined to perform similar functions, when they are determined to perform complementary or different functions, and/or responsive to any other suitable condition being met. Program merging can increase expressiveness, robustness, and/or any other suitable metric. In an example where multiple generated programs are determined for a single transformer (e.g., wherein each program represents a different task performed by transformer, each program is a child program contained within a parent program, each program is the programs determined in S300, etc.), the multiple programs can be subsequently merged, and/or partially merged. In a second example where multiple redundant programs are determined for a single transformer (e.g., in the same or different iterations of S300), the programs can be merged, and/or configured to collectively mimic the transformer (e.g., by voting, etc.).

In an eighth variant, chunks of the program can be stored (e.g., for use in transfer learning). In this variant, high-value portions of generated programs can be stored and used to generate similar programs and/or transformers in the future (e.g., for future tasks which perform similar methods). S500 can output updated programs (e.g., refactored programs, etc.), new programs (e.g., merged programs, etc.), information about programs (e.g., proofs of correctness for programs, etc.), and/or any other suitable outputs. The outputs of S500 can be stored in association with programs, transformers, program representations, program outputs, transformer outputs, and/or any other suitable system component; alternatively the outputs can not be stored.

However, running analyses on the program S500 can be otherwise performed.

Utilizing the generated program and/or generation program analyses S600 functions to improve the usage of transformers. The generated program and/or generation program analyses can be used in place of the corresponding transformer, can be used to determine metrics for the corresponding transformer for a given prompt, can be associated with the transformer and/or generated program, can be used during analysis (e.g., manual debugging, etc.), can be used to provide insight (e.g., explainability) to the transformer, and/or otherwise used.

Figure 16:
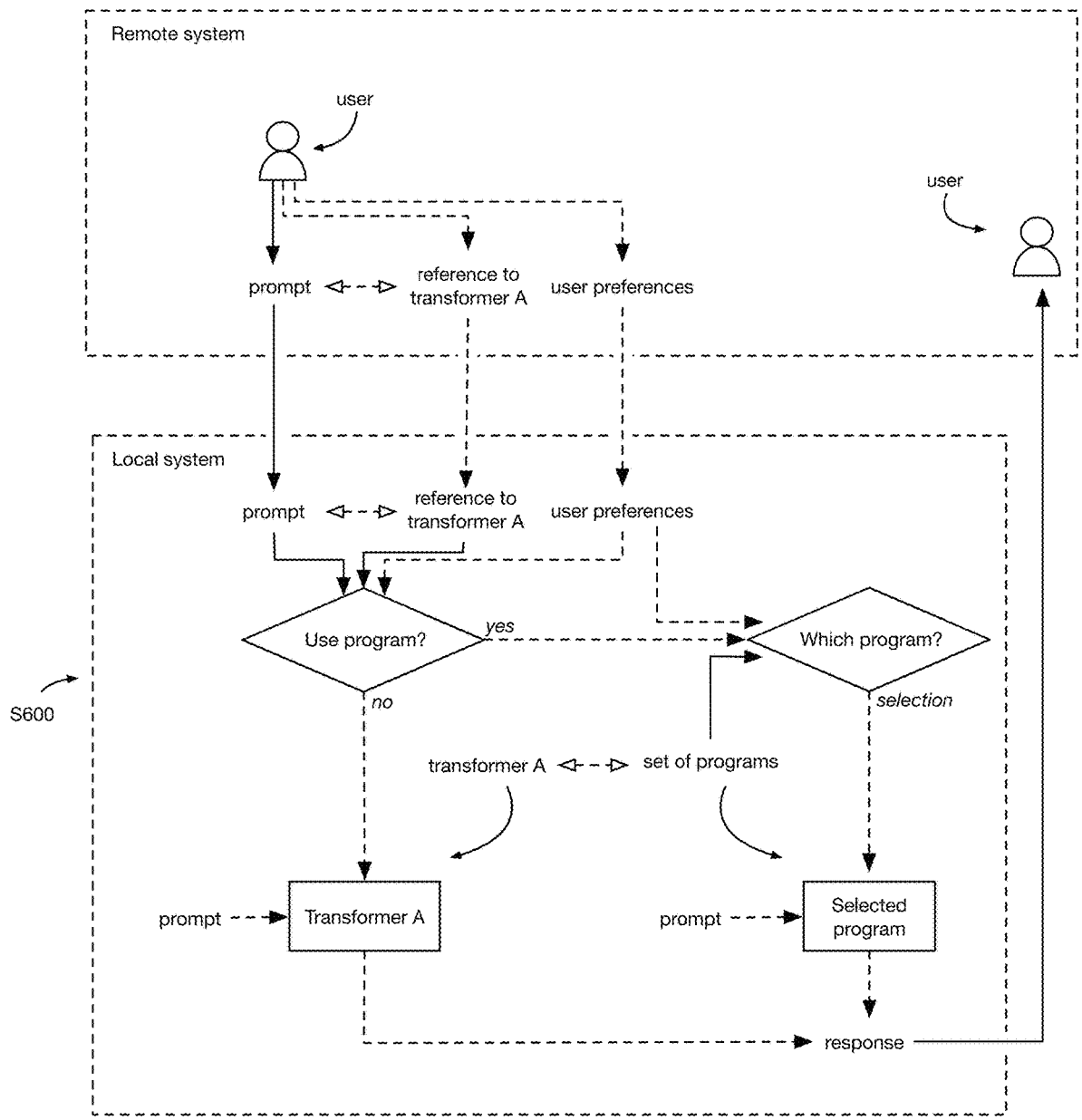
FIG. 16 is an illustrative example of a variant of S600.

In a first variant, the generated program can be used in lieu of the transformer to respond to a prompt. In this variant, a received prompt or subset thereof can be run on a generated program instead of a particular transformer. In this variant, the prompt can be associated with the transformer (e.g., intended to run on the transformer) or not associated with any particular transformer. In an example of this variant, whether to use the transformer and/or generated program (and/or which generated program to use) can be based on user cost sensitivity, user quality sensitivity, transformer alignment sensitivity (e.g., how much the user cares that the program matches the performance of the transformer, etc.), the relative importance of different metrics (e.g., inclusion preservation, quality preservation, predicted quality, computational cost, and/or other suitable metrics), and/or any other suitable variables (e.g., example shown in FIG. 16). In an example, the decision is made based on a multivariate optimization of different metrics. In an example, for a first transformer $T_1$, if a generated program $P_{1A}$ has high-quality outputs but low alignment (e.g., low inclusion preservation and/or quality preservation, etc.) with $T_1$, and generated program $P_{1B}$ has low-quality outputs but high alignment with $T_1$, then a user may want to use $P_{1A}$ in a first set of scenarios and $P_{1B}$ in a second set of scenarios. In a specific example, $P_{1A}$ may be the best generated program to use for routing (e.g., modeling the performance of $T_1$), and $P_{1B}$ may be the best generated program to use in lieu of $T_1$. Alternatively, if both $P_{1A}$ and $P_{1B}$ have low alignment and low-quality outputs, $T_1$ can be used instead. In another example, the prompt can be analyzed to determine a desired domain, wherein the program associated with the transformer and the domain is selected for use.

In a second variant, the program can be used to determine metrics for a transformer. In this variant, a program can be run on a prompt, and the output of the program can be evaluated and used to predict a metric for the transformer running the prompt (e.g., without running the transformer, etc.). In this variant, the metric can be the "performance score" described in U.S. patent application Ser. No. 18/800,900 filed Aug. 12, 2024 and titled PROMPT ROUTING SYSTEM AND METHOD, incorporated herein in its entirety by this reference, which claims the benefit of U.S. Provisional Application No. 63/532,199 filed 11 Aug. 2023, U.S. Provisional Application No. 63/588,591, filed 6 Oct. 2023, and U.S. Provisional Application No. 63/598,879 filed 14 Nov. 2023, each incorporated herein in its entirety by this reference. In this variant, the metric can be used to determine a prompt routing.

Figure 17:
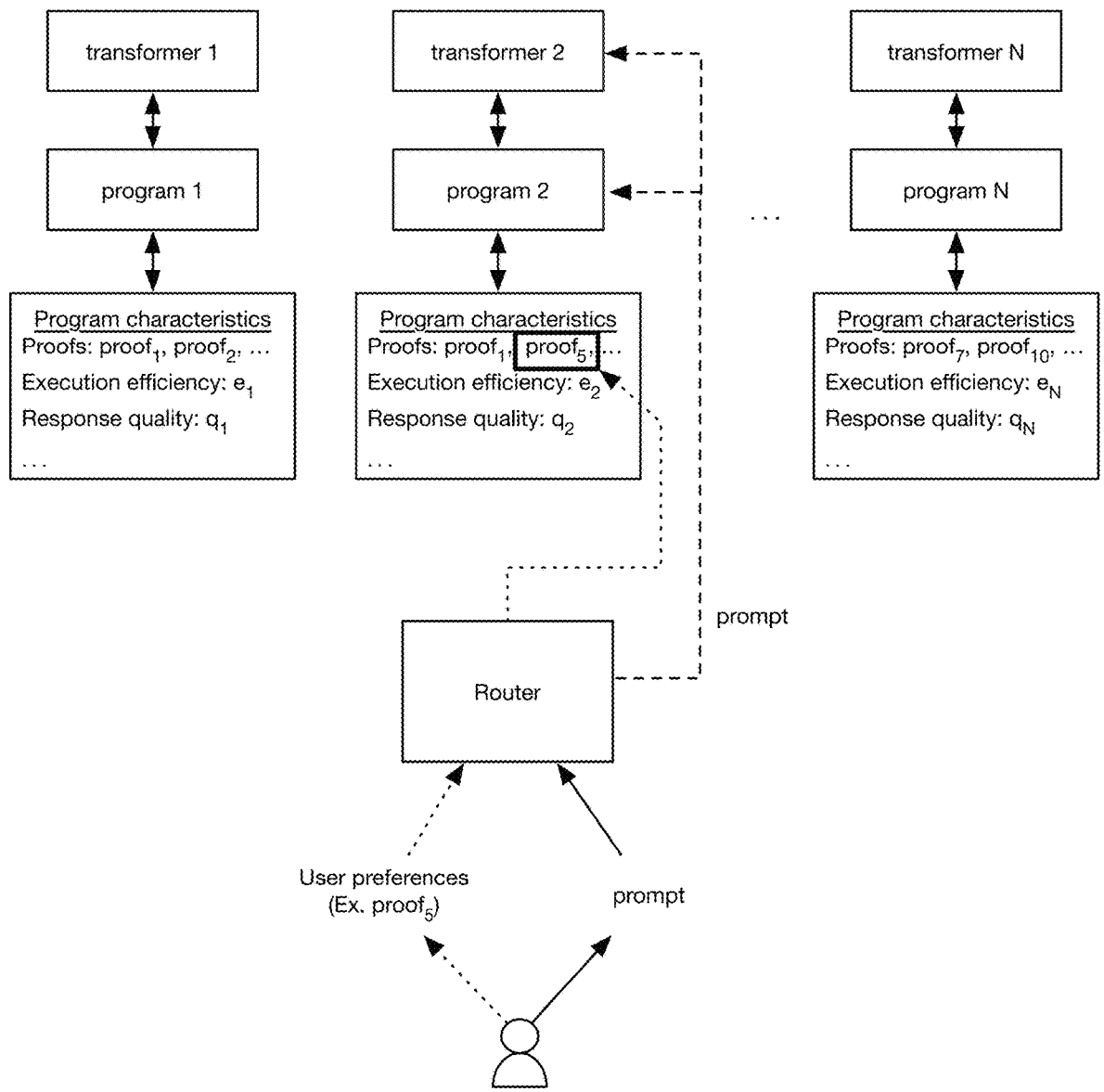
FIG. 17 is an illustrative example of a variant of using the method for prompt routing.

In a third variant, the generated program analyses from S500 can be associated with the transformer and/or generated program. In this variant, the generated program analyses can be stored in a local and/or remote database. In a first embodiment, a transformer can be selected (e.g., in S320, etc.) based on associated generated program analyses. In a first example, a transformer can be selected based on whether or not the corresponding program considers features of input data which introduce bias. In a second example, a transformer can be selected based on whether or not the corresponding program has an associated proof of correctness. In a third example, a transformer can be selected based on the type of algorithm defined within the generated program. In a second embodiment, generated program outputs can affect how outputs (e.g., outputs of transformers, programs, etc.) are used. In this embodiment, outputs can be flagged with a bias score, bias information, a "no bias" tag, and/or another suitable flag and/or no flag based on bias. In this embodiment, outputs can be flagged with a proof of correctness, indication of the existence of a proof of correctness, and/or another suitable flag and/or no flag based on a proof of correctness (e.g., example shown in FIG. 17). In a first example, given two similar transformer outputs, the transformer output associated with a particular generated program (e.g., selected based on proof of correctness, bias score, etc.), can be selected. In a second example, a generated program analysis associated with an output can be used by future programs (e.g., as an input confidence value, etc.).

However, utilizing the generated program and/or generated program analyses S600 can be otherwise performed.

All references cited herein are incorporated by reference in their entirety, except to the extent that the incorporated material is inconsistent with the express disclosure herein, in which case the language in this disclosure controls.

As used herein, "substantially" or other words of approximation can be within a predetermined error threshold or tolerance of a metric, component, or other reference, and/or be otherwise interpreted.

Optional elements, which can be included in some variants but not others, are indicated in broken lines in the figures.

Different subsystems and/or modules discussed above can be operated and controlled by the same or different entities. In the latter variants, different subsystems can communicate via: APIs (e.g., using API requests and responses, API keys, etc.), requests, and/or other communication channels. Communications between systems can be encrypted (e.g., using symmetric or asymmetric keys), signed, and/or otherwise authenticated or authorized.

Alternative embodiments implement the above methods and/or processing modules in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUS, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

However, the method can be alternatively performed.

As a person skilled in the art will recognize from the previous detailed description and from the figures and claims, modifications and changes can be made to the preferred embodiments of the invention without departing from the scope of this invention defined in the following claims.

We claim:

1. A method, comprising:
   using a transformer representation module, determining a transformer representation of a test transformer, the transformer representation comprising a set of over 10,000 learned weights extracted from intermediate hidden layers of the test transformer;
   using a trained mapping model, predicting a program using the transformer representation as a prediction input, wherein the program comprises a set of explicit instructions and mimics logical processes performed by the test transformer, wherein the mapping model is trained by:
   determining a set of target programs, wherein the set of target programs comprise restricted access sequence processing language (RASP) programs;
   from the set of target programs, generating a set of training transformers, wherein the set of training transformers are generated by mapping RASP operations in the RASP programs into transformer components; and
   training the mapping model to predict target programs from the set of target programs given training weights of training intermediate hidden layers of training transformers from the set of training transformers as training inputs;
   receiving an input for the test transformer; and
   determining an output based on the input using the program in lieu of the test transformer.

2. The method of claim 1, wherein the transformer representation comprises an encoding of parameters of the test transformer, wherein the mapping model comprises a decoder trained to decode the encoding into a representation of the program.

3. The method of claim 1, wherein the transformer representation comprises a graph representing the test transformer, wherein the mapping model comprises a graph neural network.

4. The method of claim 1, wherein the set of training transformers each comprise distinct architectures from each other.

5. The method of claim 1, further comprising modifying the program and non-deterministically converting the modified program into a second transformer.

6. The method of claim 1, further comprising refactoring the program before using the program to determine the output.

7. The method of claim 1, wherein a training transformer of the set of training transformers is generated from multiple target programs of the set of target programs, wherein the mapping model is trained to predict each of the multiple target programs based on the training transformer.

8. A method, comprising:
   extracting a set of network weights from a deep neural network (DNN) comprising over 10,000 learned network weights; and
   using a trained mapping model, non-deterministically determining a program from the set of learned network weights, wherein the program comprises a set of explicit instructions that replicate a set of input-output functionalities of the DNN, wherein the mapping model is determined by:
   determining a set of training programs written in Restricted Access Sequence Processing Language (RASP);
   determining a set of training DNNs replicating functionalities of the set of training programs by mapping RASP operations in the set of training programs to predetermined DNN components, wherein a training DNN is perturbed to augment the set of training DNNs; and
   training the mapping model using weights of the set of training DNNs as training inputs and the set of training programs as training targets.

9. The method of claim 8, wherein the DNN is a transformer.

10. The method of claim 8, further comprising repeating the method for each of a plurality of DNNs using the mapping model, wherein a different program is generated for each DNN of the plurality.

11. The method of claim 8, wherein the program is deterministic and comprises a set of explicit instructions.

12. The method of claim 8, wherein each training DNN from the set of training DNNs is associated with a single training program from the set of training programs.

13. The method of claim 8, wherein a training DNN from the set of training DNNs is generated from multiple training programs from the set of training programs.

14. The method of claim 8, wherein the training DNN comprises an encoder.

15. The method of claim 8, further comprising selecting the mapping model from a set of mapping models based on an architecture of the DNN.

16. The method of claim 8, further comprising:
    receiving a request for a transformer, comprising an input; and
    using the program in lieu of the transformer to determine an output responsive to the request.

17. The method of claim 8, further comprising using a representation model, determining a DNN representation based on the set of learned network weights, and wherein determining the program from the set of learned network weights comprises determining the program from the DNN representation.

* * * * *